United States Patent [19]

Smith et al.

[11] Patent Number: 4,942,604

[45] Date of Patent: Jul. 17, 1990

[54] LINE POWER CONTROL CIRCUIT FOR PAY STATION TELEPHONE

[75] Inventors: Benjamin A. Smith, Celeste; Conaway K. Hoback, Dallas, both of Tex.

[73] Assignee: Digital Telecommunications Systems, Inc., Dallas, Tex.

[21] Appl. No.: 210,071

[22] Filed: Jun. 22, 1988

Related U.S. Application Data

[62] Division of Ser. No. 912,984, Sep. 29, 1986, Pat. No. 4,777,647.

[51] Int. Cl.⁵ ............................................. H04M 19/00
[52] U.S. Cl. .................................... 379/412; 379/413; 379/145
[58] Field of Search ................ 379/413, 412, 200, 387, 379/145

[56] References Cited

U.S. PATENT DOCUMENTS

| | | | |
|---|---|---|---|
| 1,588,492 | 6/1926 | O'Neill | 379/412 |
| 3,996,426 | 12/1976 | Lancaster | 379/413 |
| 4,532,382 | 7/1985 | Pommer, II | 379/413 |
| 4,536,615 | 8/1985 | Kimijima et al. | 379/159 |
| 4,560,841 | 12/1985 | Pierrel | 379/413 |
| 4,578,540 | 3/1986 | Borg et al. | 379/200 |
| 4,585,904 | 4/1986 | Mincone et al. | 379/200 |
| 4,645,882 | 2/1987 | Nakayama et al. | 379/387 |
| 4,652,701 | 3/1987 | Cubrison et al. | 379/373 |
| 4,653,088 | 3/1987 | Budd et al. | 379/165 |
| 4,763,348 | 8/1988 | Sano et al. | 379/165 |
| 4,803,722 | 2/1983 | Schreiber | 379/413 |
| 4,821,319 | 4/1989 | Middleton et al. | 379/167 |
| 4,837,815 | 6/1989 | Brancati | 379/438 |

Primary Examiner—Robert Lev
Attorney, Agent, or Firm—Richards, Medlock & Andrews

[57] ABSTRACT

An interface (10) is disclosed for coupling a conventional pay station telephone (12) to a telephone switching system (16). The interface (10) provides supervision signal detection functions normally provided by a switching system, and thus can be connected thereto by a less costly business line (28). The interface includes processor controlled tone generators (72, 76) and detectors (73, 74, 81, 106, 108) for detecting tones and voltages transmitted by either the telephone (12) or the switching system (16). The interface (10) further includes a detector (106) and a procedure (FIG. 8) for providing an answer call indication. Coin collection or return is controlled by the interface (10) depending on the status of the call which is also determined by the interface (10). Further, a fail-safe relay will disconnect the phone from the tip and ring lines in the event of station irregularities. If the fail-safe relay operates during a phone call, the connection is maintained until the end of the call by power fail call holding relays.

26 Claims, 10 Drawing Sheets

FIG. 4

MEMORY LOOK-UP TABLE (146)

- BLOCKED CALLS — 210
- FREE CALLS — 212
- EMERGENCY CALLS — 214
- SPECIAL CODES — 216
- ○
- ○
- SPEED CALLS — 218
- OCC TELEPHONE NUMBER — 219

FIG. 6

TONE TABLE

| TONE TYPE | FREQ (Hz) | RATE (ON, OFF) |
|---|---|---|
| REORDER | 440 + 480 | .25, .25 |
| RINGBACK | 440 + 480 | 2, 4 |
| BUSY | 480 + 620 | .5, .5 |
| PRECISION DIALTONE | 350 + 440 | STEADY |
| OCC PROGRESS TONE | 440 | STEADY |
| "A" (COIN RETURN) | 697 + 1633 | STEADY |
| "B" (SPLASH BACK) | 770 + 1633 | STEADY |
| "C" (COIN COLLECT) | 852 + 1633 | STEADY |
| COIN TONE a) NICKEL | 1700 + 2200 | ONE LONG BURST |
| b) DIME | | TWO LONG BURSTS |
| c) QUARTER | | FIVE SHORT BURSTS |

FIG. 7

| SHORT | REORDER | BUSY | RINGBACK | STEADY TONE |
|---|---|---|---|---|
| 330 | 332 | 334 | 336 | 338 |

100mS — 400mS — 800mS — 5 Sec

LINE POWER CONTROL CIRCUIT FOR PAY STATION TELEPHONE

This is a divisional application of application Ser. No. 06/912,984, filed Sept. 29, 1986 and entitled "PAY STATION TELEPHONE INTERFACE", now U.S. Pat. No. 4,777,647, issued Oct. 11, 1988.

TECHNICAL FIELD OF THE INVENTION

The present invention relates in general to telecommunication methods and apparatus, and more particularly relates to coin-operated pay station telephones.

BACKGROUND OF THE INVENTION

There is a current trend toward the development and use of privately-owned pay station telephones. This has recently been made possible by the deregulation of such equipment.

While pay station telephones have been widely used for a long period of time, their ownership has been in the exclusive control of the major telephone operating companies. These telephone companies maintained complete control over the manufacture of pay station telephones, the installation and the distribution of revenue generated thereby. All the ancillary services attendant with a pay station telephone, such as operator services, were also supplied and controlled by the telephone operating companies.

Because of the unique nature of pay station telephone revenue collection, special communication lines and central office equipment were provided to administer the mechanics of the proper coin collection and to enable the completion of a telephone call. Because the initiation of this type of telephone call is significantly different from that of the business or residential call, the central office equipment was necessary to transmit coin collect and coin return voltages to the pay station telephone. The pay station telephone communication lines were generally not available for use by owners of privately-operated pay station telephones. Private pay station owners generally used special class marked trunks which were similar to standard business lines, but which gave an indication to an operator that the telephone was of the pay station type. Charges for making calls could then be handled accordingly. Such specialized class marked trunks are commonly known as "COCOT" trunks, an acronym for customer owned coin operated telephone.

As an alternative to the foregoing, "smart" pay station telephones have been developed for use with the conventional telephone business line. The drawback generally experienced with that approach is the user is required to learn a new method of operating the telephone. The difficulty with learning a new procedure different from a previously known and standard procedure is apparent.

Owing to the recent developments in ownership and control of pay station telephones, such apparatus may now be privately owned. This has given rise to the sale on the open market of new, reconstructed and refurbished pay station telephone sets. While the proprietor of a privately owned pay station telephone set can gain the benefit of the revenues generated therefrom, the use of specialized telecommunication services and equipment of others is still required. For example, the owners of privately held pay station telephones may subscribe to an operator service corporation to provide switchboard assistance to pay station callers. Secondly, in order to provide appropriate coin accounting, the class-marked or COCOT trunk is the only type of telephone line which can operate with the conventionally available pay station telephone.

From the foregoing, it can be seen that a need exists for improved pay station telephone equipment which can provide a sophisticated level of service to calling parties, and a higher degree of profitability to the owner. There is an associated need for a sophisticated pay station interface which is operable in conjunction with a standard pay station telephone and a standard business telephone line, and which is capable of autonomous operation so that routine calls can be completed without the need of special supervision signals associated with the COCOT trunk.

SUMMARY OF THE INVENTION

In accordance with the present invention, a pay station telephone interface is disclosed which reduces or eliminates the disadvantages and shortcomings associated with prior art communication techniques. According to the invention, a telephone interface is disclosed for permitting the operation of a conventional pay station telephone with a business grade telephone line. The interface is connected between the pay station telephone and a conventional business line, without modification to either piece of equipment. Because call answer supervision is not provided by a central office switching system over such a line, the invention includes equipment capable of detecting when a called party has answered. This is accomplished by noting various electrical characteristics of the central office supervision signals, including the reorder, busy and audible ring back tones. By eliminating the need for the class-marked coin telephone line, the operation of a pay station telephone is enhanced and simplified.

The pay station telephone interface is adapted to isolate the telephone from the central office business line, and thereby monitor signals transmitted by the telephone, process such signals and forward the signals, or other signals to the local central office. The interface also monitors a plurality of electrical parameters conventionally carried by the nonclass-marked telephone line. The parameters are used in lieu of the traditional coin telephone line signals to determine the various stages of the call. This assures the completion of the many types of telephone calls which can be made from a pay station telephone. Electrical current and voltage parameters of the business line are monitored to determine on-hook and off-hook conditions of the calling party, as well as central office indications of an on-hook condition of the called party. Various tone detectors of the interface are connected to the business line to determine when the pay station telephone caller has deposited coins, and for ascertaining the nature of the dialed digits to determine the appropriate route to be taken in accordance with the destination of the call. Depending upon whether the dialed digits are representative of a local call or a long distance call, appropriate dual tone multifrequency (DTMF) and/or rotary dial pulse signals are outpulsed to the central office to reach a local party, or to reach a long distance operator.

After the interface of the invention dials the last digit of the called party's telephone number, a wideband audio detector is connected across the business line to detect audio signals returned by the central office on such line. The detection and sequence of the audio signals is used in a unique manner so that when the called party has answered, the collection of a deposited coin can be made.

The wideband detector is constructed such that for bursts or periods of audio signals, the output is driven to a first logic state. In the absence of an audio signal, such as when there is a pause between the active periods of busy signals or ringing signals, the output of the wideband detector is driven to a second logic state. Because the cadence, or the time periods, which characterize the various active and inactive periods of the supervision signals are different for each type of signal, only the time periods of the active and inactive states are detected and recorded. The various frequencies which also characterize the different types of supervision signals are ignored, other than the fact that they are within the frequency band detected by the wideband detector.

When an audio signal, such as a supervision tone or a voice signal is detected by the wideband detector, the active time period of the signal is recorded and saved. If a subsequent audio signal is received which has a longer time period, it replaces the indication of the previously stored time period. As the call progresses, the telephone set of the called party is eventually rung, whereupon the audio ringing which is returned to the pay station telephone is detected by the interface. Since the active period of the audio ringing signal is longer than the reorder or busy signals, it will eventually be stored. No coin collection action is taken if subsequent inactive intervals or active ringing intervals are received. This merely indicates that the called party has not yet answered. However, in the event that a shorter interval, such as voice audio, is detected, and no subsequent ringing is detected, it can be safely assumed that the shorter audio signal is the voice spoken by the called party, or the short duration period signal caused by the called party answering the phone. The advantage of this technique is that no expensive individual tone decoders are required for each supervision signal frequency, and much of the processing can be accomplished by a software-controlled processor. Also this technique allows the unit to detect answer when the unit is calling a phone attached to an older central office which does not conform to the current precision call progress tone plan for busy, reorder, and ring back.

An additional feature of the invention provides security to the pay station telephone in that if an interface power failure occurs, a call in progress is allowed to proceed to completion, but no calls can be completed thereafter. The pay station telephone is connected to the business line by a switched connection which is initially established by the use of local generated power, but which is held in the switched position by the central office battery current supplied over the business line. In this manner, when the call is normally established using the local power, the central office battery current will sustain the connection between itself and the pay station telephone, so long as the pay station telephone remains off-hook. When the pay station telephone calling party goes on-hook, the electrical current through the business line is terminated, thereby dropping the connection to the central office and preventing further calls from being made until local power is restored.

With regard to yet another feature of the invention, a bidirectional transmitting modem is provided with automatic outpulsing means so that a predetermined destination can automatically be reached. A full coin box detector by software coin counting and volume calculation is supplied to indicate when a service person should empty the coin box so that the pay station telephone can continue operation. When the coin box is nearly full, the telephone number of the predetermined destination is automatically outpulsed, and the modem supplies coded information to a destination computer indicating the full coin box condition.

A pay station telephone damage indicator is also used in connection with the modem to notify service personnel that the pay station may be in need of repair. The detector includes means for monitoring when a number of calls are attempted, and no coins have been detected as being deposited on calls that require coin(s) to be deposited. Under these conditions, it can be seen that the coin slot may be jammed or damaged, and requires corrective action.

BRIEF DESCRIPTION OF THE DRAWINGS

Further features and advantages will become more apparent from the following more particular description of the preferred embodiment of the invention, as illustrated in the accompanying drawings in which like reference characters generally refer to the same parts throughout the views, and in which:

FIG. 4 depicts, a look-up table portion of the memory;

FIG. 6 is a tabulation of various standard progress tones and associated frequencies and cadences;

FIG. 7 illustrates a categorization of the various call progress tones according to the length of the active tone period;

DETAILED DESCRIPTION OF THE INVENTION

General

Figure 1:
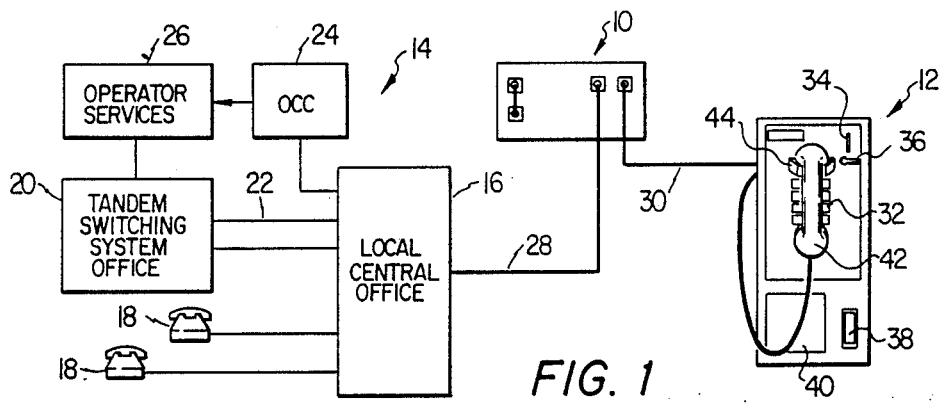
FIG. 1 is a block diagram illustrating the use of the interface of, the invention between a pay station telephone and the telecommunication network.

In order to fully appreciate the various features and advantages of the instant invention, reference is initially made to FIG. 1 of the drawings where there is shown the interface 10 of the invention connected between a pay station telephone 12 and the national telecommunication network 14. The various major telephone operating companies provide central switching offices 16 for completing telephone calls to subscribers of local telephone sets 18. Long distance telephone calls are completed by the use of tandem switching system offices 20 connected to the central office 16 by long distance trunks 22, or by microwave transmission mediums (not shown).

The tandem switching systems 20 are employed as intermediate switching systems for switching telephone calls to other destination central offices (not shown) serving associated subscribers. Other long distance common carriers, denoted as OCC 24, may be connected to the central office as an alternative for completing long distance telephone calls. As is conventional, the facilities of the other common carrier 24 can be accessed by a specific authorization code entitling the user to complete a communication path through the facility to a destination.

Private operator services 26 are also available to assist calling parties in completing telephone calls. With the recent changes made which authorize the private ownership of a pay station telephone 12, the provision of operator services 26 has grown and prospered. Indeed, operator services 26 are available for providing all the services necessary to the complete operation of the privately owned pay station facilities, which would otherwise not be available. It is not uncommon for the operator services 26 located in one geographical area to serve an entire state. Accordingly, the operator services 26 may be accessed either through the tandem switching system office 20, or through the other common carrier facilities 24.

As a departure from past practices, the pay station telephone 12 is connected to the local central office 16 by a nonclass-marked telephone line 28, otherwise designated herein as a business line. Such type of telephone line makes pay station telephone operation feasible without the need of the class marked line. However, the local central office 16 does not provide the standard coin line answer supervision signaling over the business line 28. In other words, when a telephone call is placed by the pay station telephone 12 to a called party 18, there is no specific signal sent by the central office 16 to the pay station telephone 12 indicating that the called party 18 has gone off-hook, and has therefore answered the call.

It will be discussed in more detail below the unique manner in which the interface 10 of the invention determines when a call to a destination telephone 18 has been answered. Answer supervision is highly important to a pay station telephone 12, as it must be determined whether or not a coin deposited in the telephone must be returned or collected. The simplest criterion which must be adhered to is that when a called party answers, the coin must be collected. On the other hand, if the called party is busy, or does not answer, the coin must be returned to the calling party using the pay station telephone 12.

The pay station telephone 12 and the interface 10 associated therewith can be located together on the premises of the owner. For purposes of security, the interface 10 can be located in a room or location inaccessible to the public in general. The pay station telephone 12 is connected to the interface 10 by any suitable multi-conductor cable 30. The cable 30 can be terminated with suitable connectors, such as the RJ11 type.

While the pay station telephone 12 can be of any conventionally available type, the invention as described herein is ideally suited for use in connection with a pay station telephone equipped with tone pad dialing 32. With this type of dialing, the user enters conventional dual tone multifrequency (DTMF) signals which are decoded into corresponding decimal digits by decoders located either in the interface 10, or in the local central office 16. The pay station telephone 12 includes a coin slot 34 in which coins are initially deposited. A manual coin return mechanism 36 and a coin return chamber 38 are provided to catch coins deposited, but not collected. A coin collection box 40 provides a container for holding a large number of coins which are automatically collected as a result of the completion of telephone calls made from the pay station telephone 12.

According to the operation of the majority of pay station telephones 12, the coins deposited prior to the telephone conversation are collected after the completion of the telephone call, when the handset 42 has been placed in the cradle 44, and thereby is returned to an on-hook condition. The collection of the coins in this manner is less disruptive or distracting to the telephone conversation, since the dropping of the coins into the collection box 40 can be heard. The on-hook and off-hook conditions of the handset 42 are detected by a conventional switchhook (not shown) which is located within the cradle 44. The swithhook detects the presence or absence of the handset 42 within the cradle 44.

A local telephone call by a calling party using the pay station telephone 12 is initiated by first removing the handset 42 from the cradle 44, depositing the appropriate coin or coins in the slot 34, and dialing the local number by depressing the appropriate keys on the key pad 32. In order to maintain control of the signalling between the pay station telephone 12 and the local central office 16, the interface 10 is adapted to initially isolate the business line 28 from the multi-conductor cable 30. The on-hook/off-hook status of the payphone handset is detected in the interface 10 by the flow of loop current that is started when the switch hook changes to the off-hook position. The DTMF signals generated by the pay station telephone 12 are transmitted via the connection cable 30 to the interface 10, but are not immediately transferred to the local central office 16. The interface 10 according to the invention receives the DTMF tones and decodes them into decimal digits. These digits are compared with other digits stored in a table to verify that they lie within a range which is within the local area serviced by the local central office 16. On a positive verification, the interface 10 retransmits the digits by either rotary dial pulses or DTMF tones over the business line 28 to the local central office 16. A switched connection is made in the interface 10 for connecting the business line 28 to the connection cable 30. The calling party is no longer isolated, but is connected directly to the local central office 16. However, the interface 10 monitors audio signals, as well as the dc voltage state existing on both the business line 28 and the connection cable 30. The local central office 16 processes the digits retransmitted by the interface 10 and establishes an appropriate connection from the business line 28 to the selected destination telephone set 18.

If the destination telephone set 18 is off-hook, and therefore busy, a busy signal will be returned by the local central office 16 to the calling party using the pay station telephone 12. The interface 10 also receives the busy signal, and is responsive to it in a manner to be described in more detail below. On the other hand, if the destination telephone set 18 is not busy, a ringing signal is sent by the local central office 16 to ring the telephone set 18. At the same time, audible ringing is transmitted by the local central office 16 to the pay station telephone 12. In this manner, the calling party is aware that an attempt is being made to alert the called party of an incoming call. When the called party associated with the destination telephone set 18 answers by lifting the handset off-hook, the off-hook condition is detected by the local central office 16, whereupon ringing is terminated. However, the local central office 16 does not return any specific indication of the answered call back to the business line 28. This is in contrast to class-marked coin lines where a specific call answer signal is transmitted by the local central office 16 to the pay station telephone 12. However, by using a standard business line 28, other than the termination of the audible ringing, the interface 10 is provided with no indication that the call has been answered. An answered call is highly important when providing pay station telephone services, in that the indication of an answered call is the primary criterion for determining that the coin should be collected.

There are situations which exist in which the absence of ringing cannot be used as an indication that the coin should be collected. For example, in the event the called party happens to go off-hook shortly before the local central office 16 has initiated audible ringing, a call can be completed without the transmission of audible ringing. Or, the audible ringing transmitted by the local central office 16 to the pay station telephone 12 may be prematurely tripped due to the off-hook condition, in which event the audible ringing tone may be of such an insufficient length of time that it cannot be reliably detected. It should be noted that the ringing current sent by the local central office 16 to the destination telephone set 18 is not always in phase with the audible ringing transmitted to the calling party using the pay station telephone 12. As a result, one full burst of ringing current may have been sent to the destination telephone set 18 before any audible ringing has been received by the pay station telephone 12. The called party may thus hear only a portion of a single ring, and quickly answer the call before any audible ringing is transmitted to the calling party.

Answer supervision in some types of modern privately owned pay station telephones is accomplished by requiring the calling party to depress a button on the pay station telephone when the called party answers. The depression of the button allows the communication path to be completed between the calling party and the called party, and also provides an indication to the pay station telephone that the coin should be collected. The following and more detailed description of the pay station telephone interface 10 of the invention will set forth the unique manner in which answer supervision is provided by detecting the cadence or time periods of audio signals which appear on the business line 28. The operation of the interface of the invention is transparent to the user of the pay station telephone, and thus no new operational procedures need be learned.

With reference again to FIG. 1, a telephone call placed by a calling party using the pay station telephone 12 to a long distance telephone set can also be accomplished by the use of an operator switching network. The dialing of DTMF signals representative of an operator, or the dialing of a long distance number itself, invokes the invention to make a connection by dialing an operator to either complete the call, or to assure that the call is prepaid. The caller can prepay long distance charges by either depositing the appropriate number of coins as required by the operator, or the dialing of credit card number information. In any event, the invention 10 decodes the operator number, or the long distance number, calls the operator through the local central office 16 directly or by use of the tandem switching system 20 or by way of the OCC 24, and transmits the payphone identification number, the called party number, and the optionally dialed credit card number to the operator network 26 and then connects the operator to the calling party. The operator also insures that the appropriate coins have been deposited by the calling party.

Depending upon the particular provisions desired by the owner of the pay station telephone 12, and to be described in more detail below, the operating cost of the pay station telephone 12 may be reduced by the use of other common carrier facilities 24. With this option, the interface 10 precedes the dialing of the long distance operator number with the dialing of an OCC access number, whereupon the local central office 16 connects the business line 28 to the other common carrier 24. The other common carrier 24 receives the authorization number and long distance operator number, and connects the invention to the operator services 26. After the invention transmits the payphone identification number and called number, the invention connects the calling party to the operator for the appropriate assistance.

General Functional Description

Figure 2:
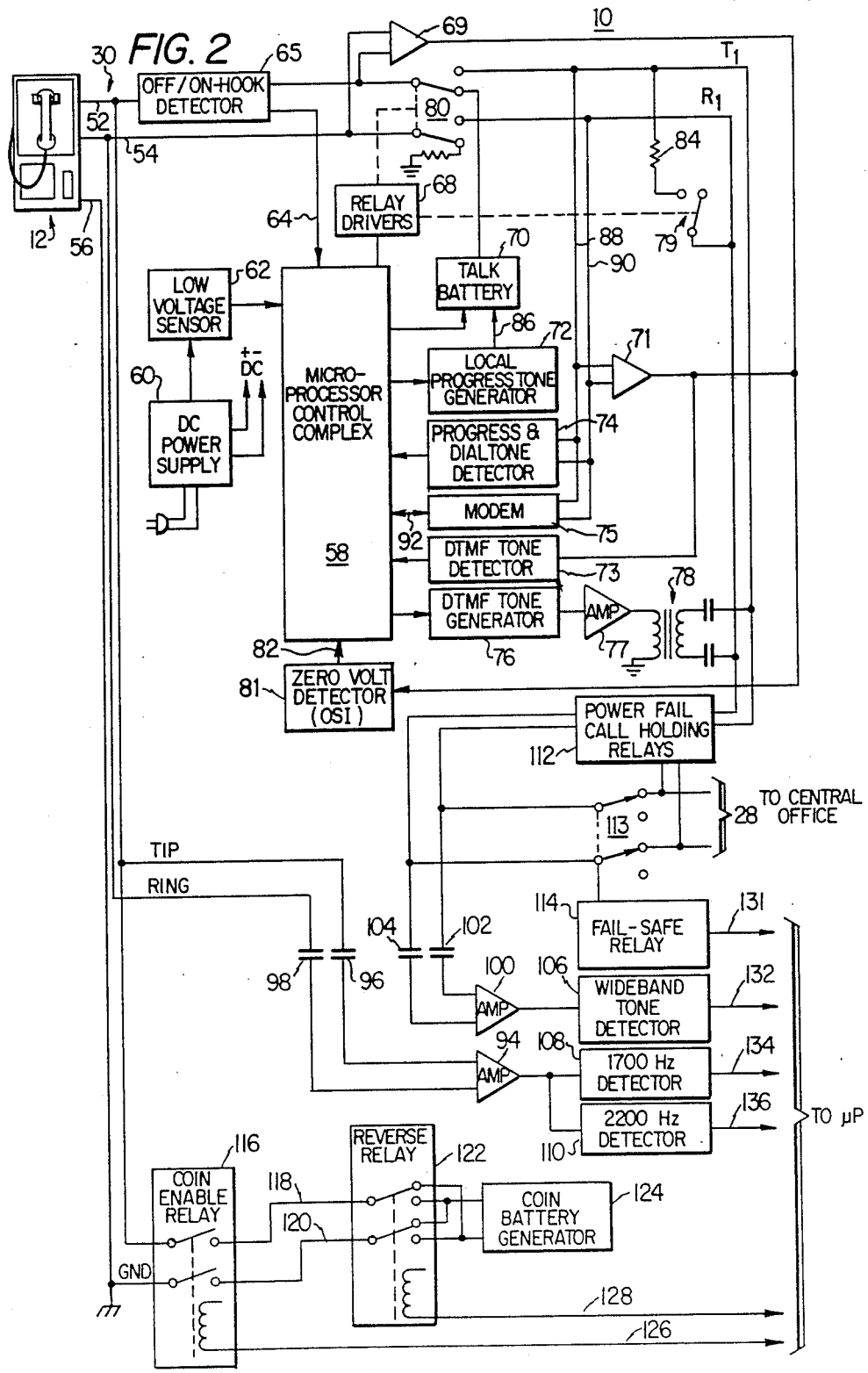
FIG. 2 is a detailed block diagram of the various functional blocks of the pay station telephone interface.

FIG. 2 illustrates in block diagram form the major functions of the interface 10 for coupling the pay station telephone 12 to the business line 28 and providing telephone services. The pay station telephone 12 is connected to the interface 10 by the connection cable 30. In practice, the cable 30 comprises a section of the telephone line comprising a tip conductor 52 and a ring conductor 54. The telephone 12 is also connected to the invention 10 by a connection 56 (coin relay ground). The interface 10 includes a microprocessor control complex 58 connected by various unidirectional and bidirectional data communication buses to the interface circuits. The microprocessor control complex 58 is program controlled to operate the interface circuits so that the pay station telephone 12 can be coupled to the standard business line 28, and perform all the standard pay station telephone functions.

A power supply 60 receives conventional 110 ac volt input and produces the various output dc voltages required by the interface 10. A low voltage sensor 62 monitors the output voltage of the dc power supply 60 and signals the microprocessor 58 when an imminent power failure has been sensed. The microprocessor 58 can then execute appropriate programs to quickly store important data concerning the present status of the interface system. The power supply also supplies battery backed up power to the 8K×8 RAM 146.

The microprocessor control complex 58 is connected by a sense line 64 to an off/on-hook detector 65. The microprocessor complex 58 is also connected to a number of relay drivers 68, to a talk battery circuit 70, a local progress tone generator 72, a DTMF tone detector 73, a dial tone and progress tone detector 74, a modem 75, and a DTMF tone generator 76. A zero volt detector (OSI) 81 is also connected by a monitor point 82 to the microprocessor complex 58. The zero volt detector 81 monitors the T1 and R1 conductors for a central office generated open switch interval. The noted circuits are under direct control of the microprocessor control complex 58, and can thus be operated to perform functions in accordance with a software program stored therein.

The relays associated with the drivers 68 operate, for example, line split contacts 80 which enable the pay station telephone 12 to be connected through the interface 10 to the central office 16 when switched through to the business line 28. When not switched, the contacts 80 connect the talk battery 70 to conductors 52 and 54 through the off/on-hook detector 65. The relay drivers 68 also control the operation of contact 79 which is in series with a resistor 84, to bridge an impedance across the tip and ring telephone line conductors T1 and R1. The timed operation of the relay contact 79 can provide dial pulse signals to the central office via the business line 28. The continued closure of contact 79 also simulates an off-hook condition of the pay station telephone 12 to the central office 16. The tone generator 72 is coupled to the talk battery 70 by conductor 86 for modulating the talk battery voltage with audio tones. The DTMF tone detector 73 has an input connected to the output of a pair of amplifiers 69 and 71. Amplifier 69 couples DTMF tones from the pay station telephone 12 to the detector 73, while amplifier 71 couples tones originating from the central office 16. The dial tone detector 74 and the modem 75 are bridged across the telephone line tip and ring conductors T1 and R1 by corresponding lines 88 and 90. DTMF tones and ring back signals appearing on the telephone line tip and ring conductors T1 and R1 can be detected by the respective detectors 73 and 74, and indications thereof transmitted to the microprocessor complex 58. The modem 75 can transmit signals on the telephone line tip and ring conductors T1 and R1, or receive information therefrom. The microprocessor complex 58 is provided with a bidirectional serial communication line 92 connected to the modem 75.

With regard to the pay station telephone interface 10 shown in FIG. 2, it should be noted that the telephone line tip and ring conductors 52 and 54 are coupled to an amplifier 94 through dc blocking capacitors 96 and 98. An amplifier 100 is connected to the telephone line section tip and ring conductors T1 and R1 through respective dc blocking capacitors 102 and 104. The output of amplifier 100 is connected to a wideband tone detector 106, while the output of amplifier 94 is connected in parallel to a respective 1700 hertz detector 108 and a 2200 hertz detector 110.

The tip and ring conductors T1 and R1 are also connected through a pair of power fail call holding relays 112 to respective contacts 113 of a fail-safe relay 114, and then to the business line 28. The fail-safe relay 114 is generally held closed by the processor 58, while the power fail call holding relays 112 are controlled by the current supplied over the business line 28 by the central office 16. The contacts of the call holding relays 112 are in parallel across the fail-safe contacts 113. Essentially, the contacts 113 are closed, as shown, during the initial placing of the telephone call to the central office 16. When the central office 16 acknowledges the call and supplies power over line 28, the call holding relays 112 will operate and bypass the contacts 113. In this manner, an interface power failure during a telephone conversation will not interrupt or prematurely terminate the call. On the other hand, if power fails when no call is in progress, subsequent calls cannot be made until the interface power is restored.

The contacts of a coin enable relay 116 are connected by respective conductors 118 and 120 to a voltage reversing relay 122. The positive and negative terminals of a coin battery generator 124 are connected to the respective poles of the double-pole double-throw reversing relay 122. The contacts of the reversing relay 122 are connected together so as to provide either a positive coin battery voltage or a negative coin battery voltage across the conductors 118 and 120, depending upon the switched position of the reversing relay 122.

The microprocessor 58 employs the relay drivers 68 to drive the respective coils of the coin enable relay 116 and the reversing relay 122 by respective conductors 126 and 128. The coin battery generator 124 is connected to the talk battery 70 as a source of power. The microprocessor complex 58 is also connected to the fail-safe relay 114 by conductor 131, and to the wideband tone detector 106 by a conductor 132. The 1700 hertz detector 108 and the 2200 hertz detector 110 are connected to the microprocessor complex 58 by respective control lines 134 and 136.

Microprocessor Control Complex

Figure 3:
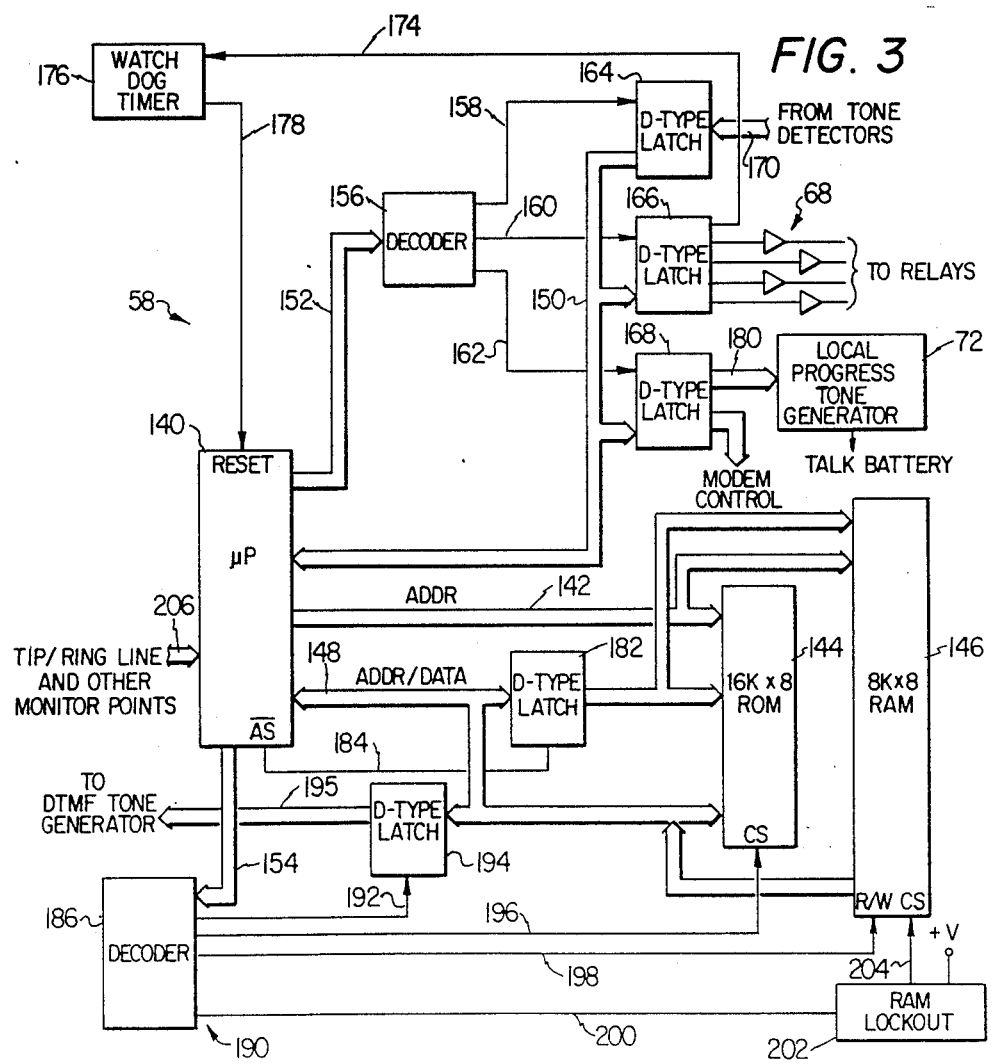
FIG. 3 is a block diagram of a processor control complex of the interface.

The microprocessor control complex 58 is set forth in more detail in the block diagram of FIG. 3. The control complex 58 includes a conventional microprocessor 140 having a plurality of input and output ports for the respective reception and transmission of data information to the various circuits of the pay station telephone interface 10. A microprocessor 140 suitable for use with the present invention is obtainable from Zilog, Inc., and identified as integrated circuit Z8681. With the noted type of microprocessor 140, some of the ports can accommodate only the output of data information, such as the address bus 142. Address bus 142 carries the high order address bits (A8-A15) for addressing a read only memory (ROM) 144 as well as a random access memory (RAM) 146.

Other microprocessor ports, such as the address/data port 148 accommodate bidirectional data information for outputting low order addresses (A0-A7), and inputting and outputting data information (D0-D8) Microprocessor port 150 is also shown as a bidirectional port for inputting or outputting data information. Microprocessor buses 152 and 154 include read/write, data select and address bits. Bus 152 is connected to a decoder 156. Based upon the address inputs applied to the decoder 156, one of the three output control leads 158, 160 or 162 becomes active to enable one of the respective D-type latches 164, 166 or 168. When enabled, latch 164 transfers data information from the tone decoders on input bus 170 to the microprocessor bus 150.

When latch 166 is enabled by control lead 160, data information placed on the bus 150 by the microprocessor 140 is latched into the latch 166. Depending upon the data applied to the latch 166, various relay drivers 68 are energized to operate corresponding relays in the interface 10. One output 174 of the latch 166 is applied to a watchdog timer 176 as a trigger. The watchdog timer 176 is of conventional design and purpose for assuring that the microprocessor 140 continues to execute program instructions without executing an endless loop. The microprocessor 140 accomplishes this by periodically triggering the watchdog timer 176 through latch 166 and conductor 174. In the event the watchdog timer 176 is not triggered by the microprocessor 140, such as when involved in an endless loop, the timer 176 automatically applies a reset signal on conductor 178 to the microprocessor 140. The microprocessor 140 then begins executing program instructions starting at a new predefined address.

The enabling of the D-type latch 168 by control conductor 162 allows data to be latched therein from the microprocessor bus 150. The data latched in circuit 168 is effective to control the modem 75, as well as the local progress tone generator 72. The binary combination of digital signals applied to the local progress tone generator 72 enables the generator to produce one of a plurality of different output progress tones. The input 180 of the tone generator 72 consists of control signals for selecting one of several tones capable of being generated by the generator 72. The local progress tone generator 72 modulates the talk battery 70 with the selected progress tone, thereby permitting the tone to be transmitted to the calling party using the pay station telephone 12.

As noted above, the address bus 142 selectively addresses memory locations in the ROM 144 and the RAM 146. Typically, the ROM 144 is an electrically programmable type of read only memory for storing the program instructions executed by the microprocessor 140. The RAM 146 includes a plurality of data tables which will be described in more detail in connection with FIG. 4. The RAM 146 also is used for scratchpad purposes by the microprocessor 140. The microprocessor 140 applies the lower order addresses to the memories 144 and 146 by way of the address latch 182. Address information is transferred from bus 148 and temporarily stored in the latch 182 by applying a clock signal to conductor 184. Data transfer either to or from the memory is then conducted by way of bus 148.

Another decoder 186 is connected to the microprocessor 140 by the multiconductor bus 154 carrying the noted address and control signals. Depending upon the address applied to decoder 186, one of the outputs 190 will be activated. Decoder output 192 enables a D-type latch 194 for temporarily storing data information for subsequent transmission on bus 195 to the DTMF tone generator 76. Decoder output 196 is applied to the chip select (cs) input of the ROM 144. Decoder output 198 carries read and write signals applied to the RAM 146. The decoder output 200 is applied to a RAM lockout circuit 202, which, in turn, applies a chip select (cs) signal to the RAM 146. The RAM lockout circuit 202 is responsive to the supply voltage magnitude of the microprocessor control complex 58 for controlling the chip selection of the RAM 146. In the event that the power supply 60 fails, the output dc voltage thereof will begin to decrease. The RAM lockout circuit 202 will detect the imminent power failure and will control the chip select conductor 204 so that the memory 146 cannot be written with potentially erroneous data.

Microprocessor bus 206 comprises a plurality of conductors extending to the pay station telephone interface circuits as monitor points. Bus 206 is effective for monitoring the tip and ring line for various status indications. Other electrical parameters are monitored and transmitted to the microprocessor 140 on bus 206. The monitor points connected to the bus 206 will be described in more detail below in connection with FIGS. 9a-9c.

FIG. 4 depicts a portion of the random access memory 146 storing plural look-up tables. One or more of the tables will typically be encountered in providing full service to the users of the pay station telephone 12 utilizing the interface 10 of the invention. The blocked call look-up table 210 stores a listing of those telephone numbers or digit patterns for which pay station telephone calls are prohibited from being completed. For example, if a designation representative of area code "900" is found in the blocked call look-up table 210, all such calls dialed to this area code will be prevented from being completed. For each number or range of numbers to be blocked, "matched pairs" of numbers are entered into the block 210 of the look-up table. In other words, for each digit of the number to be blocked, there are two digits in the table. The first digit in the table entry indicates the lower bound of the digit of the blocked number, and the second digit represents the upper bound of the digit of the blocked number. By way of example, if the prefix 976 is to be blocked, the table entry would be "997766". If the exchanges 422 and 423 were to be blocked, the entry would be "442223".

Certain calls made by calling parties from the pay station telephone 12 may be designated as free. The representations thereof will be tabulated in the free call look-up table 212. Free calls may include telephone numbers to the owner or proprietor of the pay station telephone 12 who may be remotely located from such telephone. The emergency call look-up table 214 may include telephone numbers, such as the 911 number. The special code look-up table 216 may include a tabulation of those codes which are secretly known to the calling party, and which require special processing by the interface 10 to complete the call. The speedcall look-up table 218 may include a listing of designations which, when input by the calling party, cause the automatic outpulsing of a different predetermined telephone number. Hence, the speedcall function can be effected by the interface 10 of the invention. The OCC accessed telephone number look-up table 219 may include telephone numbers which, when input by the calling party, will be automatically processed using the other common carrier rather than the major telephone operating companies. These numbers will generally be related to long distance telephone calls. Moreover, the numbers may be related to speed call numbers. For example, each speed number can be individually programmed to be carried by the direct-dial carrier or by an OCC. Since only one OCC access number/authorization code combination is normally programmed per interface 10, the speed call will be handled by the associated OCC, or by the direct-dial carrier, as specified by the table entry 219. While the various look-up tables noted above have been set forth as examples, many other types of look-up tables may be included to provide yet other functions.

Exemplary Telephone Call

Figure 5A:
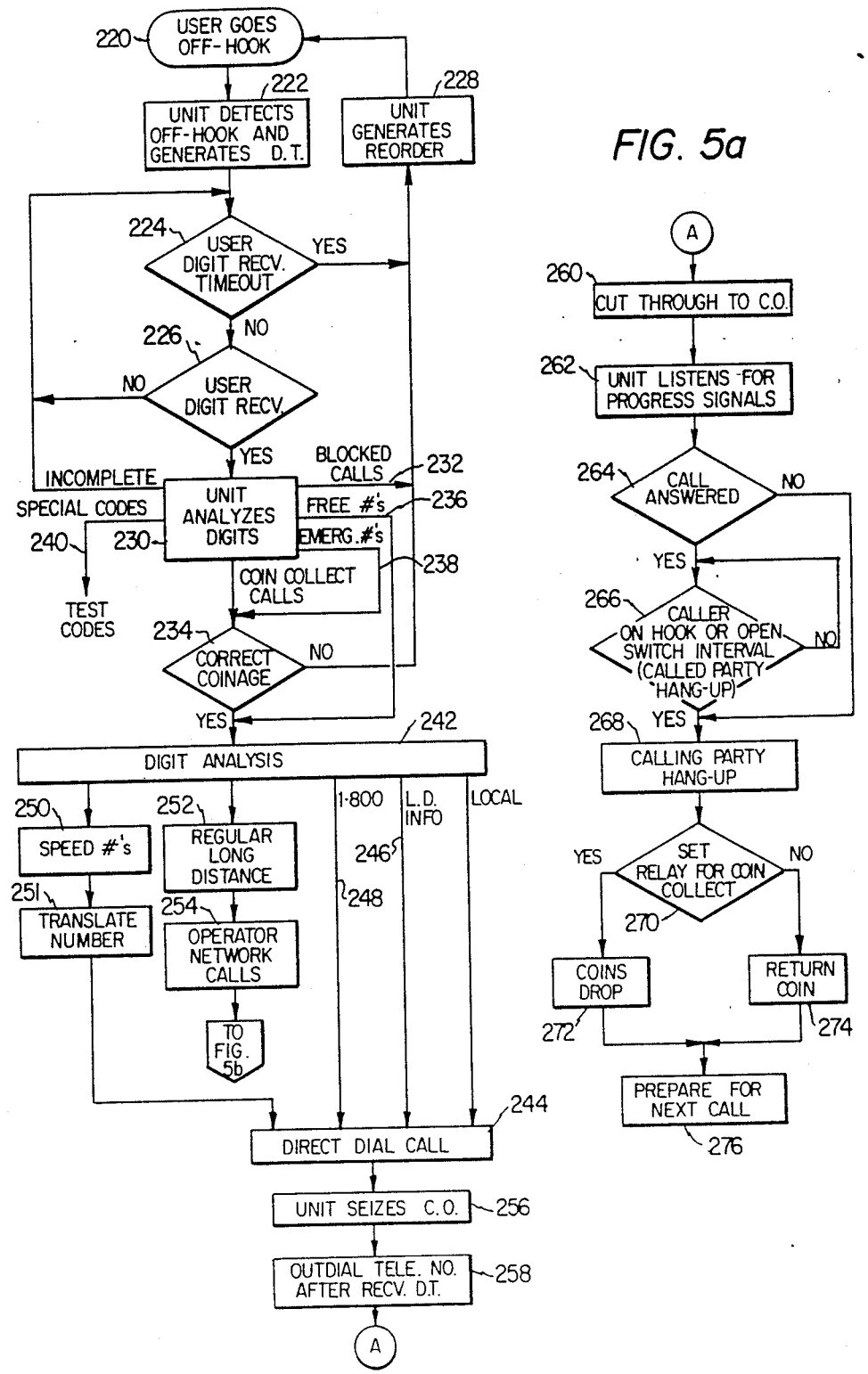
FIGS. 5a and 5b are software program flow charts of the processor operation for controlling the functions of the pay station telephone interface of the invention.

Having set forth the basic functions provided by the pay station telephone interface 10, and the connections therebetween, the overall operation will be described using FIGS. 1-4 in conjunction with the flow chart of FIGS. 5a and 5b. As with any standard telephone call, a call is initiated from the pay station telephone 12 by first lifting the receiver 42 and going off-hook. The telephone line split relay 80 has been operated by the microprocessor complex 58, and the pay station telephone 12 is thus connected to the talk battery 70. With this connection, the pay station telephone 12 is disconnected from conductors T1 and R1, and thus from the business line 28. The off-hook condition of the pay station telephone 12 connects the tip conductor 52 to the ring conductor 54 through a low resistance (not shown) within the telephone 12, whereupon current flows therethrough from the talk battery 70. The off-/on-hook detector 65 of the interface unit 10 detects the talk battery current drawn through the pay station telephone 12. A signal identifying this off-hook condition is transmitted to the microprocessor complex 58 on line 64. This is shown as block 220 of the flow chart of FIG. 5a.

According to the program flow chart block 222, the microprocessor complex 58 enables the tone generator 72 to modulate a dial tone on the talk battery voltage. The calling party is unaware of the local source of the dial tone. The calling party using the pay station telephone 12 thus receives dial tone which indicates that dialing may be commenced by depressing the keys of the tone pad 32. Of course, the instructions generally printed on the front of the pay station telephone 12 instruct the calling party to deposit the appropriate coins prior to the dialing, or at least before the dialing of the last digit, as noted by a flow chart block 226. The microprocessor complex 58 enables a DTMF tone detector 73 for receiving DTMF audio signals generated by the calling party using the tone pad 32.

On the generation of the dial tone by the local process tone generator 72, the microprocessor complex 58 also initiates an internal timer to generate a time period 224 in which the calling party must dial the first or next digit. Flow chart block 228 indicates that if no DTMF signals are detected by the tone detector 73 within this time period, the dial tone is interrupted and a reorder audio tone is transmitted to the calling party. Exit from program block 224 to block 228 may be made if excessive pauses are detected between dialed digits. The reorder audio signal alerts the calling party that a new call sequence must be initiated in order to complete the call. A new call sequence includes going on-hook, then off-hook, redepositing the coins, again receiving dial tone and dialing the desired digits. The reorder audio signal is generated by the local progress tone generator 72 by the appropriate enabling thereof of the microprocessor complex 58. As noted by block 228 of FIG. 5a, after transmitting a reorder audio tone to the calling party, the call sequence can only be continued by the user going on-hook and again going off-hook 220.

As is usually the case, the user dials digits 226 which are detected by the DTMF tone detector 73 and analyzed by the microprocessor complex 58. A general telephone number look-up table resides in the memory of the microprocessor complex 58, and is consulted 230 after the dialing of each digit of the telephone number to determine whether the telephone number is complete and whether the call should be completed, and if so, which route should be taken. In the event the dialed telephone number corresponds to a number in the look-up table 210 which should not be completed, the call is blocked 232. Again, the microprocessor complex 58 enables the local progress tone generator 72 to transmit a reorder audio signal 228 to the calling party. Telephone numbers which may be blocked from completion are programmable within the memory 146, and may include, for instance, those calls made to a "900" area code, or the like.

If the telephone number analyzed by the microprocessor complex 58 corresponds to that which requires the deposit of a coin for completion, control is branched from program block 230 to the decision block 234. Here, the program controlled microprocessor complex 58 ascertains whether the correct coinage has been deposited in the pay station telephone 12. The composite 1700 hz and 2200 hz coin tones are coupled by the tip and ring conductors 52 and 54 to the amplifier 94. The coin tone detectors 108 and 110 receive the amplified signal and produce a digital indication which is transmitted to the microprocessor 140. The various bursts of the composite coin collect tone, as identified in FIG. 6, are translated by the microprocessor 140 to determine whether the accumulation of the various coin denominations deposited in the pay station telephone 12 total the amount required The 1700 hz and 2200 hz tone detectors 108 and 110 are of conventional design providing an output logic low level corresponding to the detection of the individual coin collect tones.

The microprocessor 140 includes ports 150 driven through latch 164 by the coin tone detectors 108 and 110. The microprocessor 140 samples the detector ports via latch 164 to determine when the coin collect tones have been detected by the respective detectors 108 and 110. The time period in which the tone detection is active varies, depending upon the type of coin deposited.

As noted by reference characters 236 and 238 of the flow chart, charge free telephone numbers which are completed without charge to the calling party, are branched around the correct coinage decision block 234. In other words, such charge free numbers are processed irrespective of the detection of coins. Also, the dialed digits are analyzed 230 and compared against the look-up table 216 to determine if they match special codes 240. The special codes may include secret codes or telephone numbers used by installers or repairmen to test the operational status of the pay station telephone 12 The secret codes may not require the completion of a telephone call, but rather assure that various equipment, such as the tone generators, are operating properly.

A digit analysis 242 is conducted on those telephone numbers which require a coin deposit, and on those telephone numbers which are free 236 or are emergency numbers 238. While shown separately, the digit analysis functions indicated by 230 and 242 are combined. In the event the dialed digits are analyzed and decoded as a local telephone number, such as a seven-digit directory number, the number will be retransmitted to the local central office 16 as a direct dial call 244. Other calls which may be translated and considered as direct dial calls comprise long distance information calls 246, and "800" area code numbers 248. The pay station telephone interface 10 of the invention can also process speed dial numbers 250 to expedite the completion of a call. A look-up table 218 is again consulted for speed dial numbers, and translated 251 into the appropriate predetermined destination telephone number. The speed dial number is also direct dialed 244 to the local central office 16 or via an OCC (not shown). Speed dial numbers of this type are advantageous when used in connection with pay station telephones for completing calls to high traffic destinations. For example, such a feature may be highly advantageous in an airport, bus or train terminal where taxi or hotel numbers are frequently called. In such a situation, calling parties may be apprised of the speed call numbers by advertisements or instructions located adjacent the pay station telephone 12.

The digit analysis accomplished pursuant to program block 242 may also determine that the digits comprise a regular long distance call 252. The assistance of an operator 254 is thus required, whereupon the program is branched to the top of the flow chart of FIG. 5b.

Continuing with the direct dial calls 244, the interface unit 10 seizes 256 the local central office 16 by operating the relay associated with contact 79. A resistor 84 is thus bridged across the telephone line tip and ring T1 and R1. The resistance 84 is of such a value that the current drawn through the business line 28 from the local central office 16 alerts the central office that a request for service is being made by the pay station telephone 12. At this point in the program sequence for processing the exemplary call, the microprocessor 140 of the pay station telephone interface 10 retransmits 258 the number by outdialing the digits previously input from the tone pad 32 by the calling party. The dialed digits are retransmitted by operating the DTMF tone generator 76 such that appropriate tones are transmitted to the local central office 16 or by pulsing the rotary digits using relay 79.

Next, the programmed interface cuts the calling party through 260 to the local central office 16. This is accomplished by operating the relay associated with line split contacts 80 so that the telephone line tip and ring conductors 52 and 54 are connected to the respective conductors of the business line 28. The talk battery 70 is thus removed from the telephone line, and battery power is supplied from the local central office 16 to the business line 28. A loop is thus completed from the local central office through the off-hook pay station telephone 12.

The interface unit 10 then listens 262 for conventional progress tones or signals which are typically transmitted by the local central office 16 over the business type of line 28. For instance, if the called party is busy, a busy progress tone will be returned on the business line 28 to the calling party using the pay station telephone 12. If the called party is not busy, then the destination telephone set 18 will be rung by the local central office 16. The local central office 16 also returns audible ringing signals to the pay station telephone 12. As noted in flow diagram block 264, if the microprocessor 140 has determined that the call has been answered, a branch is made to program block 266. If, on the other hand, it has been determined that the call cannot be completed, a branch is made to block 268. The determination of whether the call has been answered is described in greater detail below.

Assuming that an answer to the call has been detected 264, the processor complex 58 continues to execute block 266 until sensing an on-hook condition of the calling party, or an open switch interval associated with the called party. Both of these indications are conclusive that the telephone call has been terminated by one of the parties. The on-hook condition of the pay station telephone 12 is detected by the off/on-hook detector 65 which is in series with the telephone line tip conductor 52. The off/on-hook detector 65 is of conventional design for sensing loop current in the telephone line tip conductor 52.

A switch internal to the pay station telephone 12 opens the loop between the telephone line tip and ring conductors 52 and 54 when the handset 42 is placed :n the cradle 44, thereby activating the hook switch. An open switch interval is an indication transmitted by the local central office 16 that the called party has gone on-hook. In executing an open switch interval signal, the local central office 16 momentarily removes battery power from the business line 28. The pay station telephone interface 10 can detect this situation by noting that there is neither loop current flowing in the telephone line, nor is there a battery voltage across the line.

In accordance with the present invention, the zero volt detector 81 is dc coupled to the telephone line tip and ring conductors T1 and R1, and can thereby detect the absence of a voltage thereacross. Accordingly, the microprocessor 140 can detect the absence of both a loop current and loop voltage which is indicative of the open switch interval. In the event the called party goes on-hook first, thereby concluding the telephone call, the microprocessor 140 commands the release of the line split relay 80, thereby isolating the pay station telephone 12 from the central office. Reorder tone is also generated by the progress tone generator 72 and returned to the calling party. This tone is repeated until the calling party goes on hook. The microprocessor 140 enables the reversing relay 122 for the appropriate collection of the coin.

In the case of a completed telephone call where the calling party should be charged, the reversing relay 122 is set to provide a positive coin battery voltage on conductor 118, and a negative battery voltage on conductor 120. In the event the coin is to be returned to the calling party, such as for the free call, the opposite voltage condition is produced by operating the releasing relay 122. According to conventional pay station telephones 12, a voltage of about one hundred volts is necessary to operate the coin collect or return mechanism. If the call is of the type where the coin should be collected, the reversing relay 122 is not operated 270, wherein the microprocessor 140 drives the coin enable relay 116 to collect or drop 272 the coin into the coin box 40. In those situations where the call is free, or in which the called party is to pay for the charge, such as for certain speed dial numbers as noted above, the program is branched from block 270 to block 274. The coin is returned by first operating reversing relay 122, and then the coin enable relay 116 so that a negative coin battery voltage can be applied to the telephone line tip conductor 118. This large negative voltage operates conventional electrical apparatus in the pay station telephone 12 to return the coin in the return slot 38.

The microprocessor 140 then branches to program flow block 276 and prepares the interface 10 for the next telephone call. In doing so, relay contacts 80 are set to the initial condition to connect the talk battery 70 to the telephone line tip conductor T1. The pay station telephone interface 10 is then prepared to sense an off-hook condition of the pay station telephone 12 by way of the off/on-hook detector 65.

From the foregoing description of an exemplary telephone call, it can be seen that the operation of the programmed microprocessor 140 can effect an efficient completion of a telephone call using an economical and ordinary business line 28, and without the receipt of answer supervision signals from the local central office 16 The pay station telephone interface 10 is also constructed to perform the processing necessary for completing long distance telephone calls. Additional considerations must be handled in completing such calls. Since the cost of a long distance call cannot be determined in advance of making the call, the money accounting matters must be handled either by the assistance of an operator, or with credit card information. In the present invention, the automatic completion of a credit card call, without the assistance of an operator, will not be dealt with in great detail.

Figure 5B:
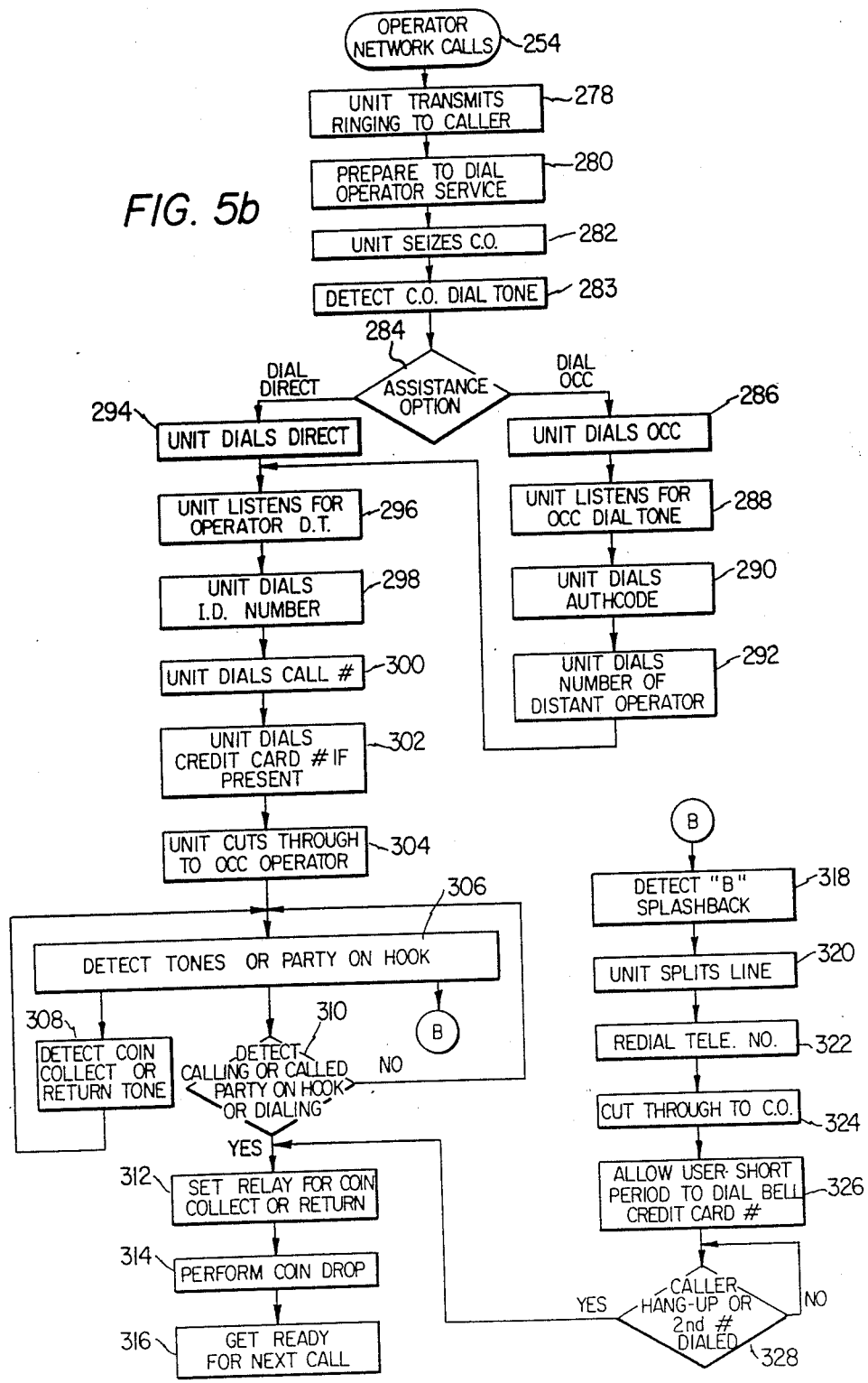

For the convenience of the reader, the programmed flow for completing a long distance, operator assisted telephone call is shown in FIG. 5b, with flow chart block 254 repeated at the top thereof. When the pay station telephone interface 10 recognizes that the digits dialed by the calling party are associated wit- a long distance telephone call, the unit automatically transmits 278 audible ringing to the calling party and dials 280 the appropriate operator service. Audible ringing is transmitted to the calling party when the local progress tone generator 72 is enabled by the microprocessor 140 to modulate the ring back tone on the talk battery 70.

The local central office 16 is then seized 282 by the interface 10 by causing the operation of relay contacts 79 and 113 to connect the telephone line tip and ring pairs T1 and R1 to the business line 28. Local central office battery current then flows through the loop formed through resistor 84 bridged across the business line 28. For long distance telephone numbers, the interface 10 of the invention can connect 284 the calling party either to an operator service by an alternate long distance carrier, or directly to the operator services. Again, the microprocessor 140 is directed to a look-up table 219 to determine whether the dialed telephone number is associated with an OCC. If so, the interface 10 dials 286 the telephone number associated with the other common carrier and awaits for the detection of dial tone 288 transmitted by the OCC. In this situation, the dial tone transmitted is of the precise type comprising composite 350 and 440 hertz, or a single 400 Hz tone signals (FIG. 6). Accordingly, the precision tone detector 74 is enabled by the microprocessor 140 to detect such audio signal. On receiving an indication of the precision tone from the OCC, the pay station telephone interface 10 automatically outpulses 290 the authorization code assigned by the OCC to the owner of the pay station telephone 12. After a brief waiting period, the interface unit 10 automatically dials 292 the telephone number of the distant operator. With this information, the OCC facilities 24 take the appropriate measures to provide a connection from the local central office 16 to the appropriate operator services 26.

Returning to program flow chart block 284, operator assistance can be reached by direct outpulsing 294 of the telephone number associated with the operator services. In either route 286 or 294, the interface unit enables 296 the precision tone decoder 74 for sensing the precision dial tone transmitted from the operator services 6. When dial tone is detected by the precision tone detector 74, and an indication thereof is provided to the microprocessor 140, the identification number of the pay station telephone 12 is automatically outpulsed 298. This identification number is assigned to the owner of the pay station telephone 12 by the operator services so that the owner can be billed for such services. If an owner has more than one pay station telephone 12 for use by the public, each would normally have programmed therein a different identification number. The identification number is a ten-digit number corresponding to the telephone number of the associated business line.

After outpulsing 298 the identification number, the interface unit 10 causes the outpulsing 300 of the long distance telephone number initially input by the calling party. In the event the user-dialed telephone number is followed by an "*", the interface unit 10 also outpulses 302 the credit card number input by the calling party. According to the conventional equipment provided by many operator services, the credit card number appears on an operator display, and thus can be used by the operator to verify that the charging information is accurate.

During the foregoing operations, the calling party has been connected only to the interface unit 10, and is isolated from the local central office 16. Moreover, the interface unit 10, rather than the local central office 16, provides the calling party with audible ringing. Other operations transparent to the calling party were taking place in the interface 10 in order to connect the calling party to the operator services 24. Block 304 of the program flow chart illustrates that after the long distance telephone number, and credit card information, if any, are passed downline, the calling party is cut through to the operator services 26. At this point, an operator located at the operator services location verbally communicates with the calling party information concerning the correct amount of money to be deposited, or with credit card information verification.

After the interface unit 10 connects the calling party to the operator services facilities 26, it waits for the detection 306 of tones, or for an on-hook indication of either the calling party or the operator. As noted above, the off/on-hook detector 65 detects such a situation with regard to the calling party, while the zero volt detector 81 is operative to detect a central office generated open switch interval signal. Also, the DTMF detector 73 is enabled 308 to detect any DTMF "A" or "C" signals (FIG. 6) indicating a respective coin return or coin collect indication transmitted by the operator. These special DTMF signals are decoded and indications thereof stored by the microprocessor 140 for the subsequent return or collection of coins after the calling party has gone on-hook. If an on-hook condition is detected 310, then the call can be considered completed, whereupon the reversing relay 122 is either left unoperated, or is operated 312 by the microprocessor 140 in accordance with the prior receipt of either an "A" or "C" DTMF signal. Lastly, the coin drop function is performed 314 depositing the coin either in the coin collection box 40 or to the return slot 38. The interface unit 10 then prepares itself to receive and process the next telephone call 316.

With reference back to program flow block 306, the operator may determine that the calling party desires to make a collect telephone call, in which event a DTMF "B" tone is returned by the operator to the interface 10. The DTMF tone detector 73 is operative to detect this composite precision tone. As between the operator service facilities 26 and the pay station interface unit 10 of the invention, the DTMF "B" tone signifies that the call is of such a nature as to require the operator services of the major telephone operating company. Collect calls comprise such a type of service which cannot be handled by the attendants of the operator service facilities 26.

On a detection 318 of the DTMF "B" tone by the DTMF tone detector 73, the interface unit 10 operates the relay associated with the contacts 80 and splits 320 the line between the calling party and the local central office 16. The unit 10 then unseizes, and reseizes business line 28. After detecting dial tone, the unit dials 322 the telephone number associated with the telephone operating company operator, and thereafter cuts 324 the calling party through to the local central office 16. The cut-through is accomplished by again operating the relay associated with line split contacts 80. After cut-through 324, the user is allowed 326 a short period of time to dial a special credit card number issued by the appropriate major telephone operating company. The microprocessor 140 is then directed to program block 328 where an on-hook condition of either the called party or calling party is monitored. In performing the functions of program block 328, the microprocessor 140 is also operative to sense dialed digits of a second number, if any. This period 328 of time is that time in which the conversation is being carried on between the calling party and the called party.

Importantly, if the called party goes on-hook, and such a condition is not signaled back to the pay station interface 10 by a local central office OSI signal, or the like, it is highly likely that the distant central office will forward dial tone to the off-hook pay station telephone 12. Unless precautions are taken to guard against this situation, the calling party could make subsequent calls without being charged accordingly. Thus, if the microprocessor 140 senses that the DTMF detector 73 is sensing dialed digits, the call will be blocked from being completed.

From program flow chart decision block 328, the microprocessor is branched to block 312 where, as described above, the reversing relay 122 is either operated or released, depending upon whether a coin should be collected or returned. The coin drop function is also performed 314. The microprocessor 140 then prepares the pay station telephone interface 10 to receive and process subsequent telephone calls.

Answer Detection

Figure 8A:
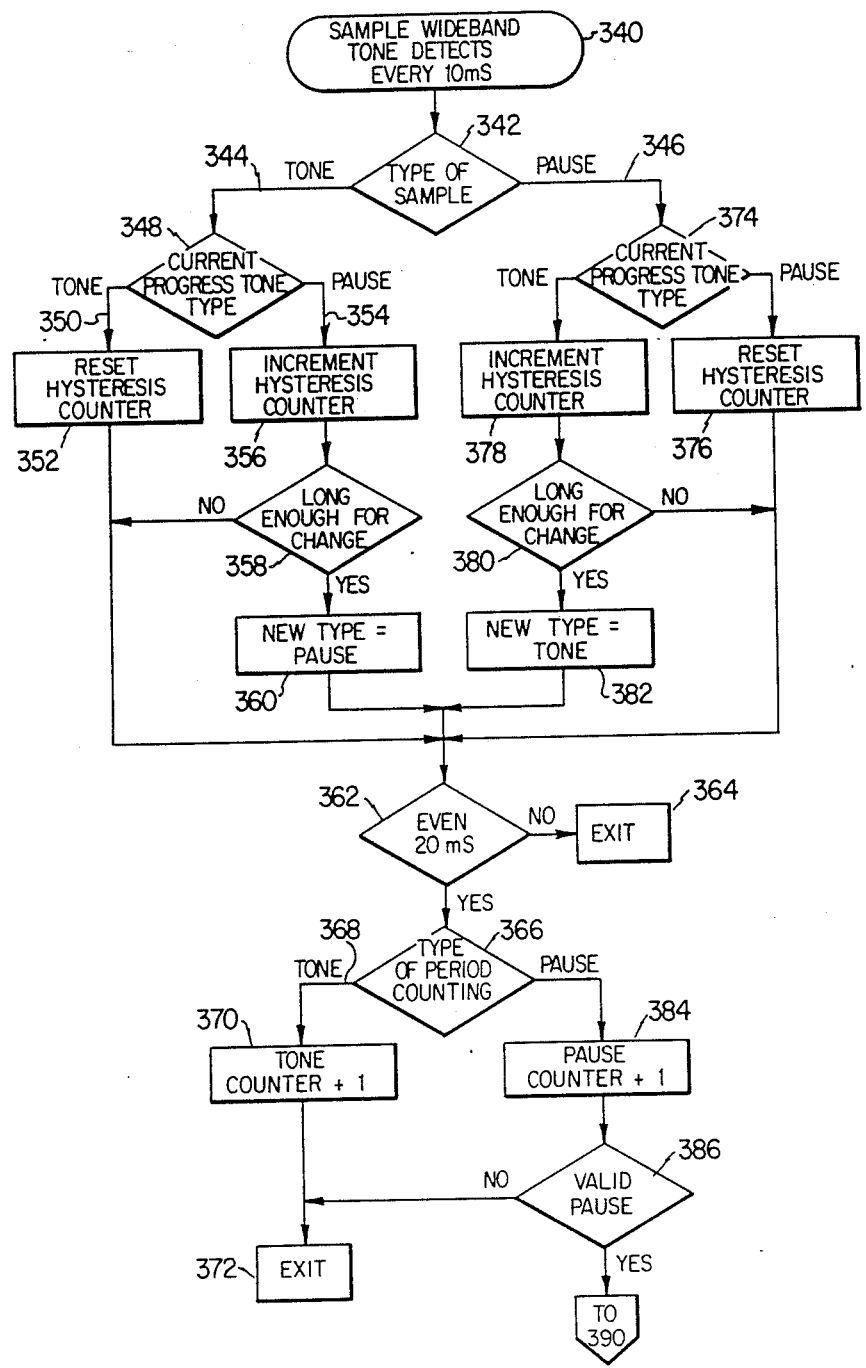
FIGS. 8a and 8b are software program flow charts of the processor operation for providing an answer supervision function.
Figure 8B:
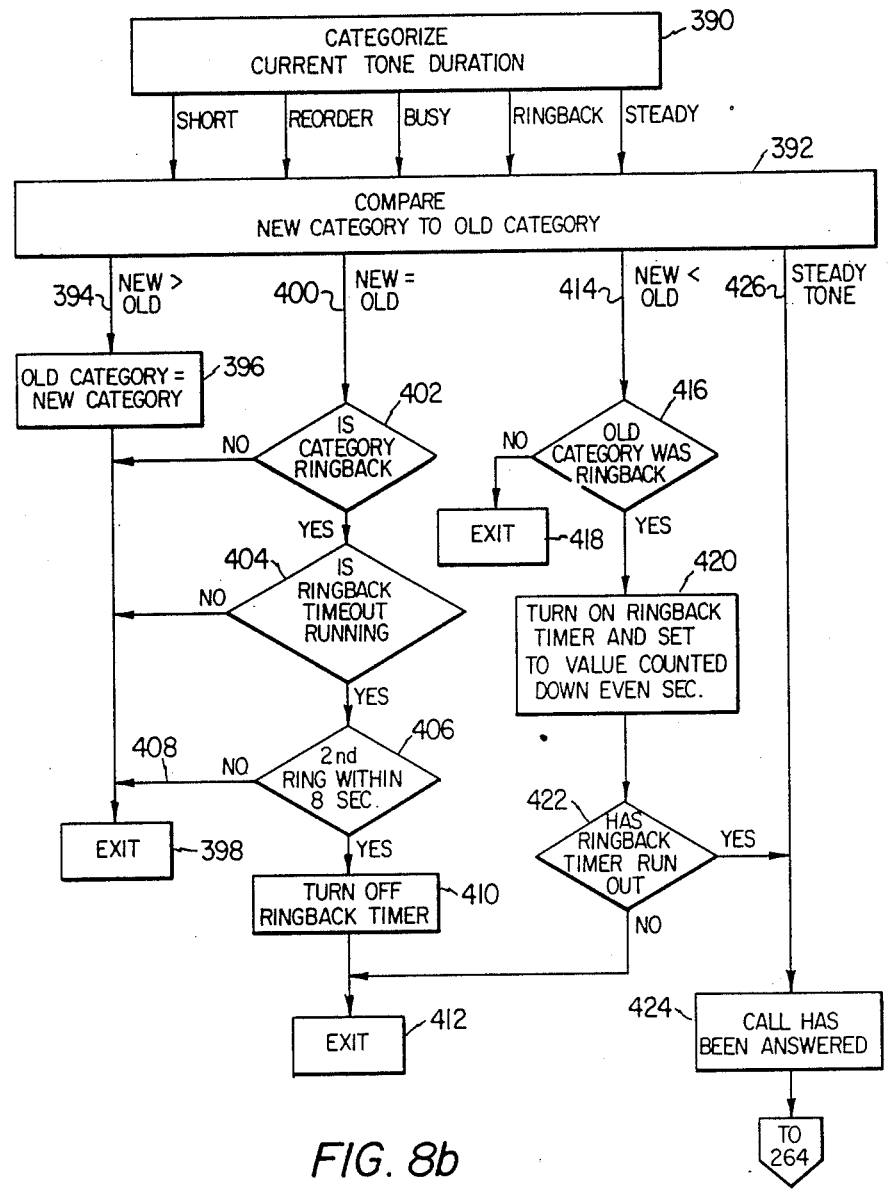

The principles of the answer detection feature of the invention are illustrated in FIGS. 7, 8a and 8b. FIG. 7 represents a time line broken down into various segments which correspond to the active time periods of standard audio progress tones conventionally transmitted by telecommunication switching systems. It is important to understand that indications of the active and inactive periods of a tone are provided by the output of the wideband tone detector 106. The active and inactive tone periods, or cadences, of various progress tones are shown in FIG. 6. As noted above, when the active period of an audio tone is present on the telephone line within the wideband tone detector's frequency range, the wideband tone detector 106 will provide an output logic high signal. During inactive states of a tone, such as during a quiet interval, the output of the wideband tone detector 106 will be at a logic low level. Thus, various audio signals present on the business telephone line 28 can be characterized by the microprocessor 140 using the length of time in which the tone is active.

With reference to the time line, segment 330 represents those audio signals having active periods of 100 milliseconds or less. Noise, electrical disturbances and syllables of voice signals may fall within segment 330. A reorder or fast-busy audio tone is active for about 150-300 milliseconds, and thus falls within the time line category designated as 332. A standard busy signal is active for about 500 ms and is classified in category 334. Audio ring back tones are active for about two seconds (and are off for four seconds) and fall into the time line category 336. The only standard or commonly occurring telephone tones existing for active time periods beyond five seconds are steady tones, such as the dial tone. Audio signals active for periods greater than five seconds are classified into category 338.

The microprocessor 140 is programmed to cyclically sense the output of the wideband tone detector 106 every ten milliseconds. The sampling periods are very short compared to the active periods of the tones. Individual samples are not determinative of the specific type of tone being detected, but rather such a determination can be made only after the accumulation of a number of samples. The audio tone samples can then be placed into the appropriate category of FIG. 7.

FIGS. 8a and 8b illustrate the programmed sequence of the microprocessor 140 in sampling the output of the wideband detector 106 in order to classify the accumulation of samples into one of the categories 330-338 of the time line. More importantly, after the microprocessor 140 has detected a unique sequence of categorized tones, it can be assured that a call placed by the pay station telephone 12 has been answered by the called party. This is highly important as the coin can be collected and deposited in the coin collection box 40 only after a call has been answered. Described next is the programmed sequence of operations for providing pay station telephone answer supervision in the absence of the central office 16 providing such an indication. It should be understood that according to conventional practices, coin phone call answer supervision is not provided generally on trunks or lines, except on the standard class-marked coin phone line. The present invention presents an advantage in that a standard business line can be used, with the pay station telephone interface providing its own call answer determination.

Flow chart block 340 of FIG. 8a illustrates those program instructions which control the microprocessor 140 to collect samples from the output of the wideband detector 106 every ten ms. Thus, every ten milliseconds the microprocessor 140 samples the digital output of the wideband tone detector 106 and records whether a logic high level, corresponding to the existence of a tone, was sampled, or whether a logic low level, corresponding to an inactive or silent period, was sampled. It should be understood that the sampling of the wideband tone detector 106 output occurs asynchronously with respect to any tone which might be present on the telephone line. It is only after the microprocessor 140 has accumulated a number of samples that it is able to determine what type of audio tone is being detected.

In accordance with this important feature of the invention, the microprocessor 140 makes a determination that a call has been answered after it has sensed a ring back tone, followed by a subsequently occurring audio tone having an active period less than 800 ms. This latter period of time is presumed to be a voice signal, as busy or reorder tones do not normally occur after the central office begins transmitting audio ring back tones. Of course, the voice signal having an active cycle less than 800 milliseconds is interpreted to be the voice answer of the called party responding to the ringing of the destination telephone set 18. It is also important to note that the following sequence is used on local telephone calls. For long distance calls, the long distance switch provides the answer supervision.

With reference again to FIG. 8a, it is assumed that the calling party using the pay station telephone 12 has gone off-hook, dialed the telephone number associated with a destination set, and that the pay station telephone 12 has been cut through to the central office 16. The progress tones transmitted by the central office 16 are thus available to the interface unit 10. Generally, the functions provided by the program flow chart of FIGS. 8a and 8b form a part of the flow chart block 264 of FIG. 5a. For each sample of the wideband detector 106 output taken by the microprocessor 140, a decision 342 is made as to whether it could be a tone 344, or a pause or silent interval 346. A logic high on the detector output indicates a possible tone, or noise, while a logic low output indicates a pause or silent period. In the event the sample taken is interpreted as an audio tone, the program branches to block 348. If the current accumulation of samples indicate that an audio tone is being received 350, a hysteresis counter is reset 352. The hysteresis counter is a software counter which functions in the nature of a filter, ignoring glitches during active and inactive tone periods. For example, if the most recent sample indicates the existence of a tone 344, but the current progress tone determination 348 indicates the existence of a pause 354, the hysteresis counter is incremented 356. In other words, the path taken as indicated by reference character 354 is indicative that the tone has either gone to its inactive state, or that a glitch in an active state has been detected.

After the hysteresis counter has been incremented 356 a nominal number of times, for example four times, it can be safely assured that the audio tone has indeed gone from an active state to an inactive state. With a sampling cycle every 10 ms, a glitch would have to exceed 40 ms in order to be considered as the active state of an audio tone. This is a highly unlikely situation. In any event, if the hysteresis counter is equal to the number of counts in which it can be considered that the characterization of the tone should be changed 358, the current progress tone is set to a pause 360. Of course, if a tone sample is detected, and the present tone type is also a tone, any intervening count stored in the hysteresis counter is purged by resetting 352 the counter. Program control is branched to flow chart block 362, which will be described later.

Returning to decision block 342, and assuming that the present sample indicates the existence of a pause 346, decision block 374 is encountered. Decision block 374, and those following which branch to decision block 362 are similar in operation to those on the left hand side of FIG. 8a, but instead address the pause interval of a tone cycle rather than the tone interval. For instance, if the present sample indicates a pause, and if the current progress tone type 374 is a pause, the hysteresis counter is reset 376. Control is then branched to decision block 362. On the other hand, if the present sample indicates a pause 346, but the current progress tone type is a tone, the hysteresis counter is incremented 378. If the number of subsequent samples indicating a tone are sufficient to change the progress tone type 380, then the new type is changed to a tone 382.

The foregoing analysis occurs every ten milliseconds, for each sample taken by the microprocessor 140 of the output of the wideband tone detector 106. However, on alternating sample cycles, for example on the even-numbered sample cycles, and for each subsequent 20 ms sample period 362, a determination is made of the type of progress tone which is most probably being transmitted by the local central office 16. If the current samples being collected from the output of the wideband tone detector 106 indicate a tone 368, then a tone counter is incremented 370. The microprocessor 140 exits 372 this portion of the program and reenters the program at 340 to process the next sample. For subsequent samples indicating a tone, the tone counter 370 continues to be incremented until a valid pause or silent period is encountered. Then, from decision block 366, the program causes a pause counter to be incremented 384. In a manner similar to the incrementing 370 of the tone counter, the pause counter continues to be incremented 384 during the entire period of a pause. If a valid pause has not been detected 386, the microprocessor control is branched back to program block 340, to process the next sample. In the event the pause is determined 386 to be a valid pause, then the next step in the program is to determine whether the previous tone detected and characterized by the count stored in the tone counter 370, is either a reorder, busy, ring back, voice or other type of audio tone.

The program-controlled microprocessor 140 categorizes the detected tone according to one of the categories listed in FIG. 7. Since the number stored in the tone counter 370 is uniquely associated with the type of tone, it can be appreciated that a reorder tone, having a shorter active period than that of a busy tone, would have a corresponding lower count than that of the busy tone. The same reasoning applies with regard to the busy tone and the ring back tone. Thus, by analyzing the count stored in the tone counter 370, and knowing that each count occurred every 20 ms, the width of the active period of the tone can be determined. It can then be determined whether the detected tone was one of those listed in FIG. 6. This is illustrated in flow chart block 390 of FIG. 8b.

At this point in the description it is important to understand that according to the principles of the present invention, as the detection of each type of tone progresses through the calling cycle, an indication is noted only of the tone which includes the longest active period. A comparison is thus made 392 between a previously detected type of tone, and a new detected type of tone. If the comparison 392 shows that the new detected tone has an active period longer than the older detected tone 394, then the old category is set equal 396 to the newly detected category. As an example, if the old tone was reorder, and the new tone detected was a busy tone, then since the active period of the busy tone is longer than that of the reorder tone, the new category will be the busy tone.

Control is then branched to exit 398 to continue processing samples. If the new category is equal to the old category 400, as in a situation where more than one active period of a tone has been detected, control is branched to decision block 402. If the new tone type equals the old tone type, and if the tone type does not equal 404 the characteristics of the ring back type, the processor again branches to the exit 398. On the other hand, when the category is determined to be that of the ring back tone, a ring back timer is interrogated 404 to determine if it is running. If not, the microprocessor 140 is branched to the exit 398. The ring back timer is a software type of timer which normally runs for about 8 seconds. If a second ring back tone is heard within the timer period 406, then it is known that the call has not been answered. The timer is then turned off 410. The 8 second timer period has been chosen as it is assured that an additional ring back active period will occur within the 8 second period. The active period of the ring back tone is two seconds long, and the inactive period is four seconds. Thus, in the noted 8 second period, at least two active periods can occur.

In the event that a second ring back active period does not occur 408 within the timer period, control of the microprocessor 140 is branched to the exit 398. This situation occurs when, for example, a ring has occurred, the called party has gone off-hook, but there is no audio conversation yet. This procedure also addresses the situation in which the calling party speaks into the pay station telephone handset 42 during an active period of a ring back signal. It is to be noted that a ring back active period can be classified as such up to five seconds. Notwithstanding, if a subsequent ring back tone is detected within 8 seconds of the preceding ring back period, the call is considered as not having been answered.

A comparison 414 indicating that the active period of the new category is less than that of the old category, but that the category was not a ring back tone 416, causes the microprocessor 140 to exit 418 to continue processing samples. However, if the old category was ring back, then the ring back timer is turned on 420. This situation exists after the last ring back signal before the called party has answered, the called party has spoken, and the audio voice signal detected by the wideband detector 106 has an active duration less than the two second duration of the ring back signal. After the new type of tone has been categorized as having an active period of less than that of a previously detected ring back tone, and if the ring back tone timer has expired 422, then it can be considered that the call has been answered 424. In other words, since no additional active ring back cycle has been detected after the short audio speech signal, it must be considered that the ringing has been tripped by the called party going off-hook.

The last situation in which an answered call must be detected is that which is associated with a steady tone 426. This situation arises when the calling party dials a number associated with another common carrier 24, and such common carrier returns dial tone. The calling party then dials the authorization code and the telephone number associated with the destination set. This type of call requires the collection of the coin, and thus an indication of an answered call. The coin is collected whether or not the other common carrier 24 actually completes the call to the destination telephone set.

In brief summary, the foregoing discloses the principles by which answer supervision is provided without relying on the transmission of answer supervision signals from the local central office 16. As a result, a conventional business line can be used for coupling the pay station telephone 12 to the local central office 16, without compromising any of the services provided by the pay station telephone. Also, costly frequency analyzing circuits need not be used to ascertain whether a ring back tone has been received. Rather, answer detection is provided by examining the active periods of the various call progress tones normally encountered in placing telephone call. The system also allows answers to be determined when the distant central office is not using precise frequency busy, reorder and ring back tones

Detailed Interface Structure

Figure 9A:
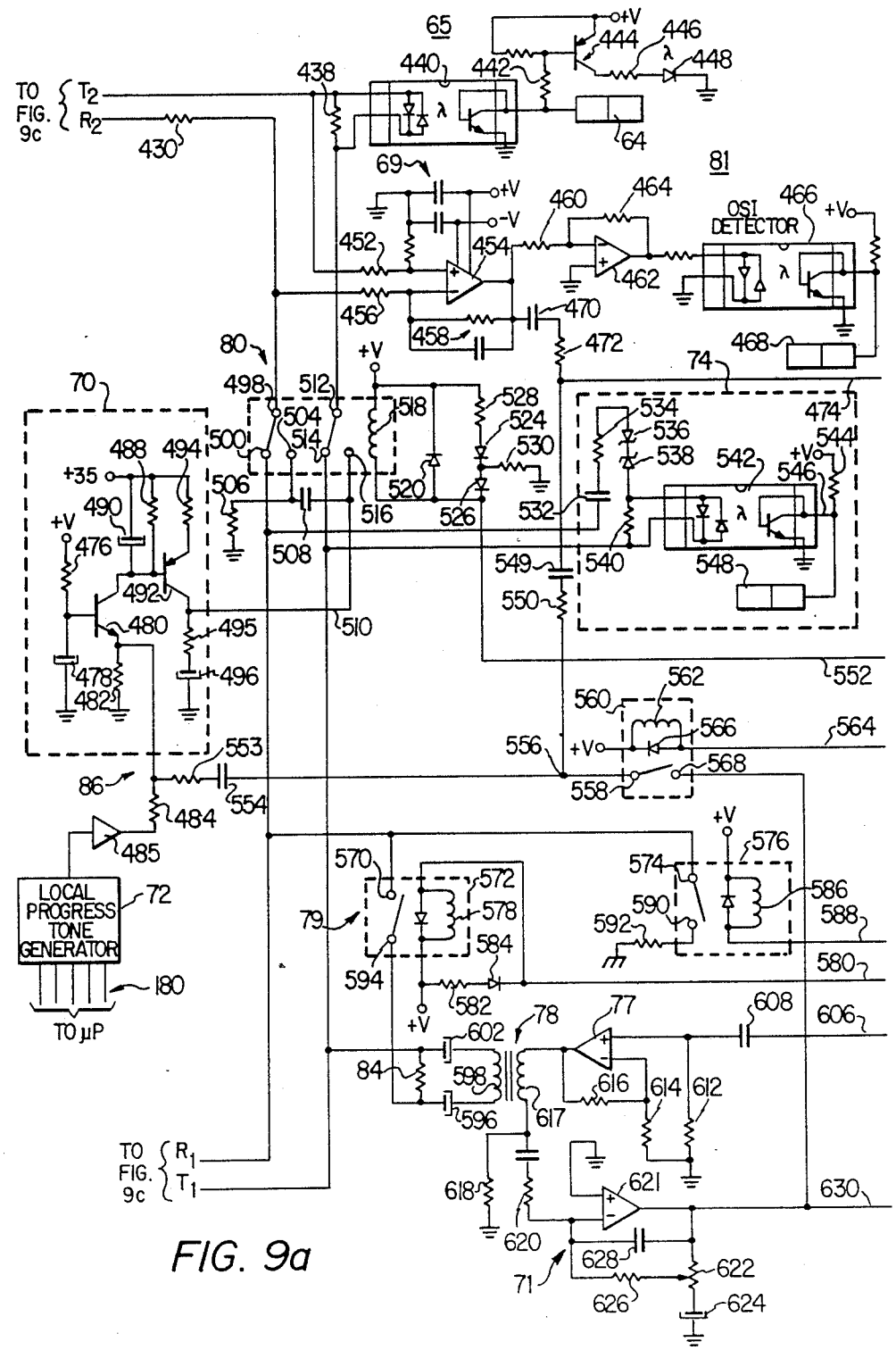
FIGS. 9a, 9b and 9c are detailed electrical schematic drawings illustrating the circuits of FIG. 2.
Figure 9B:
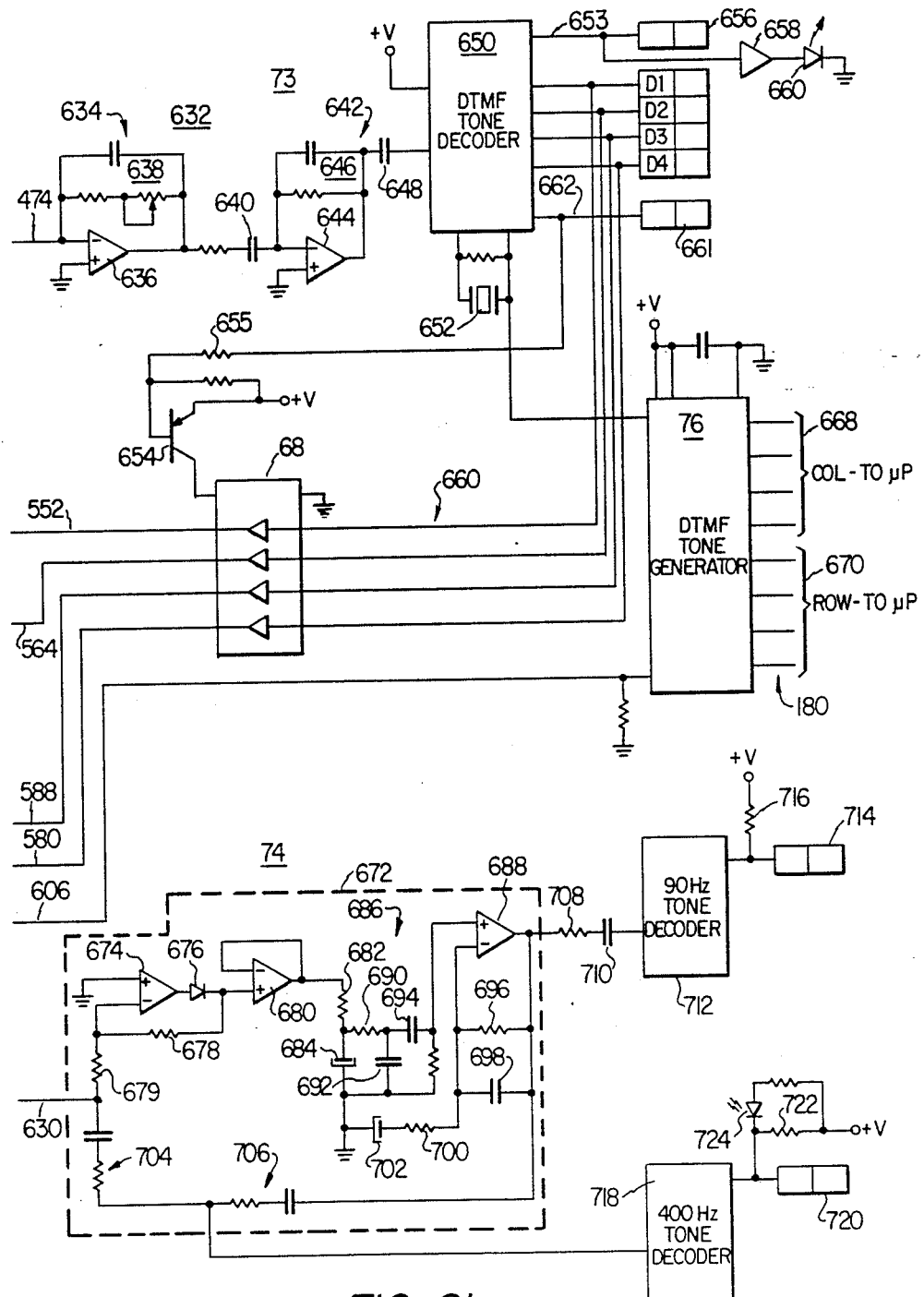
Figure 9C:
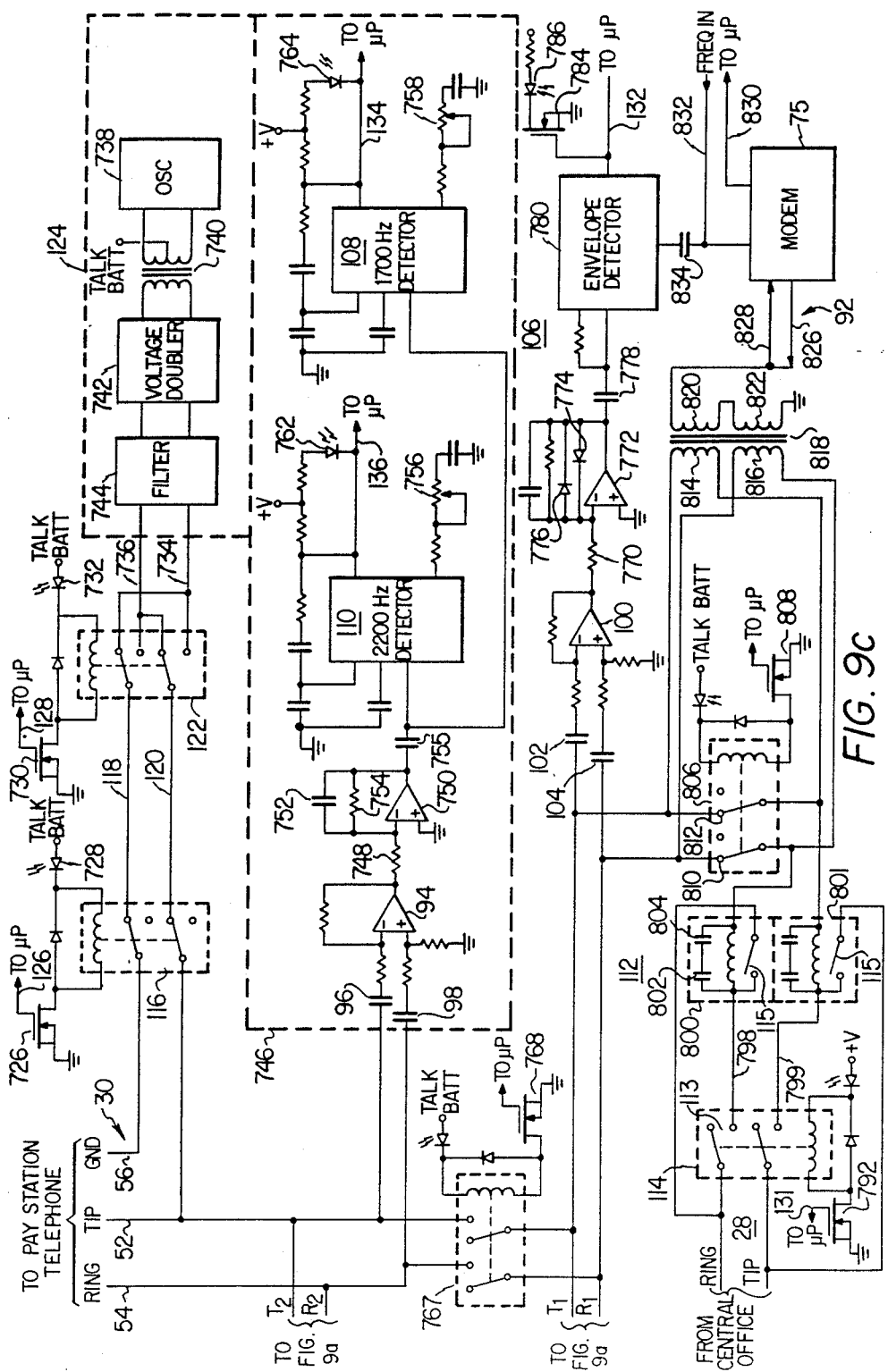

The details of the pay station telephone interface unit 10 are shown in more detail in FIGS. 9a–9c. The construction of the interface unit 10 is best illustrated by referring first to FIG. 9a, where a tip and ring conductor, designated as T2 and R2, connect together circuit appearing on FIGS. 9a and 9c. The ring conductor R2 is connected in series with a resistor 430 to the line split relay 80.

The tip conductor T2 is connected to a series resistor 438, which resistor senses current in the tip conductor T2. Resistor 438 is bridged across a bidirectional diode input of an opto-isolator 440. The transistor output of the opto-isolator 440 includes a collector load resistor 442 which is effective to bias a PNP transistor 444 into conduction. The emitter of the transistor 444 is connected to the supply voltage V., while the collector is connected through a load resistor 446 to the annode of a light emitting diode (LED) 448. The cathode of the light emitting diode 448 is grounded. A microprocessor monitor point 64 is connected to the transistor collector of the opto-isolator 440, thereby supplying a digital indication when loop current is flowing in the tip conductor T2. During off-hook conditions, a voltage of about six volts exists across T2 and R2. When the transistor of the opto-isolator 440 is driven in conduction by the occurrence of tip conductor line current, transistor 444 is also driven into conduction to illuminate the LED 448. The illumination of the LED 448 supplies a visual indication when loop current is flowing in the tip conductor T2. As noted above, loop current flows in the tip and ring conductors T2 and R2 when the handset 42 of the pay station telephone 12 is removed from its cradle 44.

The tip conductor T2 is connected through a series resistor 452 to the non-inverting input of an amplifier 454. The ring conductor R2 is connected through resistor 430, as noted above, as well as through series resistor 456 to the inverting input of the amplifier 454. Amplifier 454 includes a feedback network 458 with component values to establish unity gain, and to establish an ac frequency response sensitive to conventional DTMF tone frequencies. Thus, amplifier 454 is responsive to any DTMF signal appearing on the tip and ring conductors T2 and R2. The six volt off-hook condition is reproduced at the output of amplifier 454 during talking on the pay station telephone 12. Also, in the event a zero voltage condition exists across the tip and ring conductors T2 and R2, such as during central office open switch interval (OSI) signaling, the output of the amplifier 454 is driven to a zero voltage.

The output of the amplifier 454 is connected through a series resistor 460 to the inverting intput of an amplifier 462. The non-inverting input thereof is grounded. With the feedback resistor 464, the amplifier 462 has a gain of about five. The output of the amplifier 462 is connected to the bidirectional input of an optical-isolator 466. The transistor output of the optical-isolator 466 is constructed similar to those described above, providing a monitor output 468 to the microprocessor complex 58 for processing OSI signals. An off-hook condition produces a negative voltage at the output of amplifier 462. Opto-isolator 466 is thus turned on and drives the monitor point to a low voltage. An OSI signal produces a zero voltage at the output of amplifier 462, thus shutting off the opto-islocator 466. The microprocessor monitors point is then driven to a logic high level. The amplifier 454 also functions as a station-side audio amplifier for coupling signals through a series capacitor 470 and resistor 472 arrangement to an output 474. The function of the output 474 will be described in connection with FIG. 9b.

The talk battery 70 is illustrated as a constant current source comprising a series resistor 476 and capacitor 478 combination connected between power and ground. The junction of these two components is connected to the base of an NPN transistor 480, the emitter of which is connected through a resistor 482 to ground. The emitter of the transistor 480 is connected through another resistor 484 to a progress tone amplifier 485. The local progress tone generator 72 drives the amplifier 485 with the particular tone selected, based upon the digital signals applied to the input 180. The tone signal appearing at the output of the amplifier 485 modulates the signal on the talk battery voltage. The microprocessor complex 58 applies digital signals to the local progress tone generator 72 for transmitting a desired tone to the pay station telephone 12.

The collector of transistor 480 is connected to a thrity-five volt supply by a parallel resistor 488 and capacitor 490 arrangement. The collector of transistor 480 is also connected to the base of a PNP driver transistor 492. The emitter of transistor 492 is connected through a series resistor 494 to the thirty-five volt supply voltage. The collector of transistor 492 is connected through a series resistor 495 and capacitor 496 arrangement to ground. The collector of the driver transistor 492 comprises the output of the talk battery for supplying local power to the pay station telephone 12.

The talk battery circuit 70 is switchable to the tip and ring conductors T2 and R2 by the line split relay 80. Line split relay 80 includes a switch pole 498 connected to the ring conductor R2 through the series resistor 430. Pole 498 is switchable to a first contact 500 which is connected to the ring conductor R1 routed to the circuit of FIG. 9c. A second contact 504, switchable to the pole 498, is connected to ground through a resistor 506, and through a capacitor 508 to the output 510 of the talk battery circuit 70. The pole 512 of the other switch in line split relay 80 is connected through the series resistor 438 to the tip conductor T2. The normally closed contact is identified as reference character 514. The normally open contact associated with switch pole 512 is connected to the output of the talk battery circuit 70. Line split relay 80 includes a coil winding 518 with a diode 520 shunted thereacross, the parallel combination being connected between a supply voltage V+ and an output 552 extended to FIG. 9b. For transient suppressing purposes, a coil network comprising diodes 524 and 526 are connected in series with a resistor 528 across the relay coil 518. The junction of the diodes 524 and 526 is connected through a resistor 530 to ground.

The normally closed contacts 500 and 514, associated with respective switch poles 498 and 512, are connected to the input of the ringback detector circuit 74. The ringback detector 74 is constructed with a series capacitor 532, a resistor 534, a pair of series-connected cathode-to-cathode Zener diodes 536 and 538, connected to the ring conductor R1. The annode of diode 538 is connected through a current sensing resistor 540 to the tip conductor T1. The telephone ringing current flows through the resistor 540 when the ringing voltage exceeds about twenty-three volts, the voltage required to overcome the respective forward and reverse voltages of the Zener diodes 536 and 538. When ringing current flows through the resistor 540, one or both of the diodes in the optical isolator 542 will become forward biased and turn on the transistor, also built within the isolator 542.

A resistor 544 is connected between a source of voltage V+ and the opto-isolator output 546. A microprocessor monitor point 548 is also connected to the opto-isolator output 546 to sense when ringing has been detected. The opto-isolator output 546 is a digital representation of the ringing signal, driven between V. and ground, but including the same cadence as that of the ringing signal. As noted above, the presence of a ringing signal is not detected directly, but rather is decoded after inspection of the cadence and frequency parameters The junction of interconnection 474 and resistor 472 is connected to a series network comprising capacitor 549 and resistor 550. Another series network comprising resistor 553 and capacitor 554 are connected between resistors 484 and 550. The junction 556 joining the series networks is connected to the switch pole 558 of a relay 560. Relay 560 includes a coil 562 connected between a voltage supply and an interconnection 564 connected to the buffer driver 68 of FIG. 9b. A diode 566 is paralleled across the relay coil 562 to suppress inductive voltage spikes. The relay 560 is operable to effect a switch connection between the switch pole 558 and contact 568.

Ring conductor R1 is extended to the circuit of FIG. 9c, and is also connected to a contact 570 of relay 572, as well as the switch pole 574 of relay 576 (FIG. 9a). The coil 578 of relay 572 has one end thereof connected to a supply voltage V., and the other end connected to interconnection conductor 580. A resistor 582 and diode 584 form a series network paralleled across the coil 578 of relay 572. The coil 586 of relay 576 is also connected between a supply voltage V. and an interconnection conductor 588. The switch contact 590 of relay 576 is connected through a resistor 592 to earth ground.

The switch pole 594 of relay 572 is connected through a capacitor 596 to one side of the primary 598 of a transformer 78. The other side of the transformer primary 598 is connected to a second capacitor 602 to the tip conductor T1. A resistor 84 is connected between tip conductor T1 and switch pole 594. Interconnection conductor 606 is connected by a capacitor 608 to the noninverting input of an amplifier 77. The noninverting and inverting inputs of amplifier 77 are connected to ground through respective resistors 612 and 614. A feedback resistor 616 is connected between the inverting input and the output of amplifier 77. The output of amplifier 77 drives the primary 617 of the transformer 78. The transformer primary 617 is coupled to ground through resistor 618, and is also coupled through a series capacitor 619 and resistor 620 to the inverting input of another amplifier 621. The noninverting input of amplifier 621 is grounded. The output of amplifier 621 is connected to ground through an adjustable potentiometer 622 and a series-connected capacitor 624. The adjustable terminal of the potentiometer 622 is connected through a resistor 626 to the inverting input of amplifier 621. A capacitor 628 is also connected between the amplifier output and the inverting input. The amplifier output is connected to interconnecting line 630, which is also connected to the switch contact 568 of relay 560. Amplifier 621 can function to couple tones, such as central office generated dial tones, through closed contacts of relay 560 to the talk battery 70. CO tones can be coupled by amplifier 621 through the capacitor 554 and resistor 552 to modulate the talk battery 70. The calling party can thus hear the remotely generated dial tone. An alternate path for central office generated DTMF signals is from the amplifier 621, through the relay 560, and to the output 474 by way of the resistor 550 and capacitor 549.

With reference now to FIG. 9b, interconnecting line 474 is connected to a DTMF band pass filter 632, comprising a part of the DTMF detector 73. The band pass filter 632 includes a low pass section 634 comprising a preamplifier 636 and a feedback network 638 to provide a band pass of about 300–3000 hertz. The low pass filter section 634 is coupled by a capacitor 640 to a filter section 642 comprising an amplifier 644 and a feedback network 646. Filter section 642 essentially smooths the frequency components of the electrical signals output by filter section 634.

The output of filter section 642 is coupled by a capacitor 648 to the input of a conventional DTMF tone decoder 650. The tone decoder 650 is provided with a crystal 652 for establishing a reference frequency. The DTMF tone decoder 650 is provided with four outputs D1, D2, D4, and D8. The four DTMF tone decoder outputs are driven to specific combinations of logic levels when any of the sixteen possible DTMF tones are decoded. The microprocessor complex 58 is connected to the four tone decoder outputs for determining which DTMF tone has been decoded. The DTMF tone decoder 650 is provided with an additional output 653 which gives an indication when a valid DTMF tone has been decoded. The microprocessor complex 58 is also connected to the monitor point 656 to sense when the tone decoder has decoded a valid tone. A buffer driver 658 drives a visual indicator 660 on the valid decoding of a DTMF tone by the decoder 650.

The DTMF tone decoder 650 includes an enable input 662 connected to a PNP transistor 654 through a series resistor 655. The emitter of the transistor 654 is connected to a source of voltage V+, while the collector thereof is connected to the power supply input terminal of the buffer driver circuit 68. When the microprocessor complex 58 interrogates the tone decoder 650 for the presence of DTMF information, a short duration positive pulse is applied by the microprocessor 140 to the input 662 of the DTMF tone decoder 650.

According to the operation of the DTMF tone decoder 650, the positive pulse on input 662 causes a pattern of digital signals to be output on terminals D1, D2, D4, and D8, which pattern is representative of the DTMF tone decoded. The positive pulse applied to tone decoder input 662 is also effective to turn off transistor 654, thereby removing power from the buffer driver circuit 68. However, since the buffer drivers 68 are used to drive mechanical relays, the microsecond interruption of power thereto has no effect on the operation or release of the respective relay contacts. With power momentarily removed from the buffer driver circuits 68, the effective input impedances of the buffer drivers is increased. Thus, while the microprocessor 140 is providing relay drive to the inputs of the buffer drivers 68, such input can be momentarily interrupted to provide a DTMF tone decoder output on the same bus. A sharing of the four bus lines D1–D8 can thus be effected to provide two circuit functions.

The crystal frequency 652 is also applied to a DTMF tone generator 76. The tone generator 76 is a conventional integrated circuit chip which provides DTMF tones on an output 606, based upon a combination of digital signals presented to its input 180. The inputs 180 are latched signals provided by the microprocessor complex 58. One group of inputs 668 corresponds to four column tones, while the other input group 670 selects a row of DTMF tones. Depending on which one of the four column lines, and which one of the four row lines are selected, a composite tone, comprising the selected DTMF tone will be output on 606. The selected DTMF tone is transmitted via interconnection line 606 to the amplifier 77, amplified, and transformer coupled by transformer 78 to the tip and ring conductors T1 and R1. Relay 572 must also be operated to couple DTMF tones from generator 76 to the T1 and R1 conductors.

The interconnection line 630 is connected to a tone detector 672 for detecting the presence of the dial tones. The tone detector 672 includes a halfwave detector including differential amplifier 674 and a diode 676 connected to the output thereof. A resistor 678 is connected from the cathode of diode 676 back to the inverting input of the amplifier 674. The noninverting input of amplifier 674 is grounded. The interconnecting line 630 is coupled through resistor 679 to the inverting input of the amplifier 674. The cathode of the halfwave rectifier diode 676 is connected to the noninverting input of a second amplifier 680. The amplifier 680 operates as a voltage follower by connection of the output thereof back to the inverting input. The output of amplifier 680 is coupled through a resistor 682 to a filter capacitor 684 to ground. The capacitor 684 is on the order of one microfarad, for filtering the high frequency components from the output of amplifier 680.

The junction of the resistor 682 and the capacitor 684 is connected to a low frequency demodulator 686 comprised of an amplifier 688 and components connected to the input thereof for achieving the demodulation function. The input components include a resistor 690 connected to the junction of resistor 682 and capacitor 684. The other end of resistor 690 is connected in parallel to capacitors 692 and 694. One terminal of capacitor 692 is grounded, while the other terminal of capacitor 694 is connected to the noninverting input of amplifier 688. A feedback network comprising a resistor 696 connected across a capacitor 698 is connected from the output of amplifier 688 to the inverting input of such amplifier.

A series-connected resistor 700 and capacitor 702 are connected between ground and the inverting input of amplifier 688. A pair of series capacitor-resistor networks 704 and 706 are connected in series between interconnection line 630 and the output of amplifier 688. The output of amplifier 688 is also connected in series through a resistor 708 and a capacitor 710 to the input of a conventional 90 hertz tone decoder 712. The output of the 90 hertz tone decoder 712 is connected to a microprocessor monitor point 714. The output of the tone decoder 712 is also pulled up to a supply voltage through a resistor 716.

The junction of series connected resistor-capacitor networks 704 and 706 is connected to a 400 hertz tone decoder 718. The output of the 400 hertz tone decoder 718 is connected to a microprocessor monitor point 720. The 400 hertz tone decoder output is also connected through a load resistor 722 to a source of supply voltage. A light emitting diode 724 is illuminated when the output of the 400 hertz tone decoder 718 is active, i.e., in a logic low state.

FIG. 9c illustrates additional circuits connected to those of FIGS. 9a and 9b. The tip conductor 52 and the ground conductor 56 extended to the pay station telephone 12 are connected to contacts of the double poles of coin enable relay 116. The coil winding of relay 116 is connected between the talk battery voltage 70 and a field effect transistor 726. The gate of transistor 726 is driven by the microprocessor 140 to operate or release the relay 116. An indicator LED 728 is illuminated when the microprocessor 140 drives the transistor 726 into conduction, thereby operating the relay 116. The switch poles of relay 116 are connected by respective conductors 118 and 120 to respective switch poles of the reversing relay 122. The coil of reversing relay 122 is connected between the talk battery 70 and a field effect transistor 730, also driven by the microprocessor 140. An indicator LED 732 is illuminated when the microprocessor 140 drives transistor 730 into conduction, thereby operating the reversing relay 122. The relay 122 is shown in the released state, wherein conductors 734 and 736 are switched to respective conductors 118 and 120. When relay 122 is operated, the switched connections are reversed, wherein conductors 734 and 736 are connected to respective conductors 120 and 118.

The coin battery generator 124 is connected to conductors 734 and 736 of relay 122 so that the output voltage of the coin battery generator 124 can be switched with a desired polarity to conductors 118 and 120. When the reversing relay 122 is operated, the output voltage of the coin battery generator 124 is applied with a reversed polarity to conductors 118 and 120.

The coin battery generator 124 is of conventional design employing an oscillator 738 which drives the primary of a center tapped transformer 740 in a push-pull manner. The talk battery supply voltage is alternately switched through the transformer primary. The turns ratio of the transformer is about 1:1. The secondary of the transformer 740 is connected to a voltage doubler 742 which doubles the voltage appearing on the transformer secondary. Because the transformer primary is center tapped and driven by the talk battery voltage (15 volts), the output of the voltage doubler 742 is about 140 volts. A filter 744 is provided for filtering the output voltage of the voltage doubler 742, and for applying the filtered voltage to the conductors 734 and 736.

The tip and ring conductors 52 and 54 are also connected to a coin tone detect circuit 746. As described above in connection with FIG. 2, ac signals on the tip and ring conductors 52 and 54 are coupled to the amplifier 94 by respective capacitors 96 and 98. The amplifier 94 is configured as a buffer, having unity gain to the 1700 and 2200 hertz coin tone frequencies. The output of amplifier 94 is coupled by a resistor 748 to the inverting input of an amplifier 750. The noninverting input of amplifier 750 is grounded, while a parallel capacitor 752 and resistor 754 are connected from the amplifier output back to the inverting input thereof. Amplifier 750 amplifies the coin tone frequencies by a factor of about ten, and couples such signals by capacitor 755 to the 2200 hertz detector 110 and to the 1700 hertz detector 108. The respective coin tone detectors 110 and 108 are constructed using types LM567 integrated circuits with potentiometers 756 and 758 for tuning the detectors to respond to the noted frequencies. The 2200 hertz detector 110 includes an output 136 which is driven to a logic low level when a 2200 hertz signal is detected. An indicator LED 762 illuminates when such a tone is detected. The tone detector output 136 is also connected to the microprocessor complex 58 for sensing when the 2200 hertz tone frequency has been detected. The 1700 hertz detector 108 is comparably constructed, with an indicator LED 764 and an output 134 connected to the microprocessor complex 58.

The tip and ring conductors 52 and 54 are also connected to contacts of a test relay 767. As with the other relays described above, the coil of test relay 767 is connected to a field effect transistor 768, the gate of which is driven by the microprocessor 140. The respective switched poles of test relay 767 are connected to R1, T1, as well as the coupling capacitors 102 and 104 associated with buffer amplifier 100. The test relay 767 functions to switch the central office side audio signals to the station or telephone side detectors, and vice versa. Thus, DTMF signaling impressed on the central office side is impressed on the station side DTMF detector 73, and precision tones provided on the station side of the interface can be sensed by the central office side detectors.

The buffer amplifier 100 is configured as a unity gain amplifier. The output of the buffer amplifier 100 is connected through a series resistor 770 to the inverting input of an amplifier 772. Amplifier 772 comprises a part of the wideband tone detector 106. Diodes 774 and 776 are oppositely poled, and connected in parallel between the amplifier output and the inverting input thereof. The ac signal input to amplifier 772 is amplified by a factor of about five, with the positive and negative peaks thereof clipped by diodes 774 and 776. The clipped ac signal is coupled through a capacitor 778 to an envelope detector 780, also comprising a part of the wideband tone detector 106. The envelope detector 780 is constructed of an integrated circuit chip identified as M980. Envelope detector 780 is provided with a "detect" output 132 which is driven to a logic high state when active. The detect output 132 is connected to the gate of a FET transistor 784 which drives an indicator LED 786. When the envelope detector 780 is detecting an input signal, the LED 786 is illuminated. The detect output 132 is connected to the microprocessor complex 58. The detect output 132 comprises a digital signal which is periodically sensed by the microprocessor 140 to derive the cadence characteristics of the call progress tones.

The business line 28, connecting the central office 16 to the pay station telephone interface 10, is connected to the switch poles 113 of a fail-safe relay 114. The coil of the fail-safe relay 114 is connected between the interface power supply 60 and a microprocessor-driven transistor 792. When transistor 792 is driven into conduction by the microprocessor 140, the fail-safe relay 114 is operated, thereby connecting the tip and ring of the business line 28 through to a pair of power fail call-holding relays 800 and 801, collectively referred to above as relays 112. One end of the coil associated with relay 800 is connected by a conductor 798 to a contact of fail-safe relay 114, which contact is switchable to the ring conductor of the business line 28. The conductor 799 is switchable through a contact of fail-safe relay 114 to the ring conductor of business line 28. Bridging the coil of relay 800 are a pair of series-connected capacitors 802 and 804. The other end of the power fail call-holding relay 800 is connected to a switch pole of a double pole modem enable relay 806. The power fail call-holding relay 801 is comparably connected to the business line 28, the fail-safe relay 114 and the modem enable relay 806.

The coil of the modem enable relay 806 is connected at one end thereof to the talk battery 70, and at the other end thereof to a processor controlled field effect transistor 808. The microprocessor 140 causes the relay 806 to operate to thereby gate audio information to or from the modem 75. Switched contact 810 of modem enable relay 806 is connected to line R1. The other switched contact 812 is connected to line T1. Each switch associated with the modem enable relay 806 is connected across a respective transformer winding 814 and 816 and is operative to short circuit each transformer winding.

A pair of series-connected windings 820 and 822 of transformer 818 are connected between ground and the modem 75. The modem 75 is of conventional design, for example, a modem identified by integrated circuit type 74HC942. The modem 75 can transmit information to the business line 28 on output 826, or receive information therefrom on input 828. Information transmitted by the modem 75 to the business line 28, or received by the modem 75 over the business line 28, is accomplished bidirectionally through transformer 818. The modem 75 communicates with the microprocessor 140 over line 830. The microprocessor 140 can thus load the modem 75 with information to be transmitted to the central office 16 over the business line 28, or can receive information transmitted from a remote location to the pay station telephone interface 10. A frequency of about 3.579545 MHz is supplied on line 832 to the envelope detector 780 and the modem 75 to establish an operating frequency for such circuits. The operating frequency is coupled to the envelope detector 780 by capacitor 834.

Detailed Interface Operation

The operation of the circuits of FIGS. 9a - 9c are described in more detail below. Off-hook indications of the pay station telephone 12 are detected by sensing loop current in the T2 line conductor. Current sensing resistor 438 is about 100 ohms and is placed in the T2 conductor to sense the presence of loop current. When loop current flow through conductor T2, one of the diodes in the optical isolator 440 will then be forward biased and drive the associated transistor into conduction. The periodic interrogation of monitor point 64 by the microprocessor 140 will thus detect the off-hook condition of the pay station telephone 12. As noted above, when the transistor of the optical isolator 440 is driven into conduction, transistor 444 is also rendered conductive, thereby illuminating the LED 448.

The optical isolator 440 may also be used by the microprocessor 140 to sense dial pulses. Dial pulses carried by conductor T2 cause the current therein to be interrupted at the dial pulse rate. These current interruptions are sensed by the resistor 438, and are reproduced at the monitor point 64, albeit with a reversed phase, as a corresponding digital signal. The microprocessor 140 can thus determine the digit represented by the number of dial pulses occurring on conductor T2. A reversal of the battery voltage applied to the conductor T2 as a result of the central office reversing the battery voltage on the business line 28 has no effect on the indication presented by the monitor point 64. The diodes arranged in the optical isolator 440 are connected in parallel, anode-to-cathode, and thus form a conduction path irrespective of the direction of the current. In some situations, the battery reversal occasioned by the local central office 16 is a signal that the called party has answered. Since the microprocessor monitor point 64 is not responsive to the battery reversal, answer superVision is provided using the scheme described above. On-hook conditions of the telephone 12 are available to the processor complex 58 from off-/on-hook detector 65 for processing telephone calls to completion.

The amplifier 454 is dc coupled to the conductors T2 and R2, and thus can sense current flowing in both such conductors, as well as a voltage therebetween. The open switch interval signal comprises the absence of a voltage applied by the local central office 16 to the business line 28. With a zero voltage between T2 and R2, the output of amplifier 454 is at a zero voltage. Otherwise, the amplifier 454 is biased to unity gain so that when a voltage exists between the T2 and R2 conductors, the output voltage of the amplifier is of like amplitude and polarity. The open switch interval indication (zero volts) is reproduced by buffer amplifier 462 and applied to the optical isolator 466. The open switch interval indication is detected as a logic high by the microprocessor 140 at monitor point 468.

The amplifier 454 is also effective to couple central office DTMF signals to the DTMF tone decoder 73. Central office DTMF signals are coupled from the business line 28, through the fail-safe relay 114, the power fail call holding relays 112, and the modem enable relay 806 to the T1 and R1 conductors (FIG. 9c). The DTMF signals are then coupled through the capacitors 602 and 596 to the winding 598 of transformer 78 (FIG. 9a). The DTMF signals are then coupled by the transformer secondary 617 to the input of amplifier 621. The output of amplifier 621 is connected to the switch contact 568 of relay 560. When it is desired to couple the central office DTMF signals to the tone detector 73, the microprocessor 140 causes relay 560 to operate. The DTMF signals are thus coupled through the relay 560 to the input of amplifier 636 (FIG. 9b). The DTMF signals are appropriately amplified and filtered by amplifiers 636 and 644 before being applied to the DTMF tone decoder circuit 650. The DTMF tone decoder 650 can comprise an integrated circuit identified as type SSI-202, obtainable from Silicon Systems, Inc. The D1-D8 outputs of the decoder 650 are monitored by the microprocessor 140 and further decoded to determine exactly which DTMF tone is being processed by the decoder 650. As noted above, the integrated circuit decoder chip 650 is enabled by a logic signal applied by the microprocessor 140 to the monitor point 661.

The line split relay 80 (FIG. 9a) switchably connects conductors T2 and R2 to their respective conductors T1 and R1. Line split relay 80 is operative to isolate the pay station telephone 12 from the business line 28 so that signals can be communicated between the microprocessor control complex 58 and the pay station telephone 12, without such signals being coupled to the local central office. The line split relay 80 is operated when a logic low is applied to conductor 552. This logic low signal causes current to flow through the relay winding 518, thus switching the respective poles 498 and 512 to respective contacts 504 and 516. T2 and R2 conductors are thereby isolated from associated T1 and R1 conductors. Also, voltage generated by the talk battery circuit 70 is switched by conductor 510 to the T2 conductor. The R2 conductor is switched through a 200 ohm resistor 506 to ground.

The microprocessor 140 controls the operation of the line split relay 80 by applying a logic low both to the D1 monitor point connected to the DTMF tone decoder circuit 650, and to the monitor point 661. As noted above, monitor point 661 is normally at a low logic level, and thus no specific provisions need be made by the microprocessor 140, with regard to monitor 661, to operate the line split relay 80. The logic low on monitor point 661 drives transistor 654 into conduction, thereby supplying the V. voltage to the buffer driver circuit 68. The logic low applied by the microprocessor 140 to monitor point D1 is coupled through the respective buffer driver in circuit 68, whereupon the logic low is applied to conductor 552. The line split relay 80 is operated so long as the logic low signal is applied to monitor point D1.

The talk battery comprises transistor 480 biased into conduction by resistor 476. Capacitor 478 filters the voltage applied to the base terminal of the transistor 480. Supply voltage applied across transistor 480 is divided between the collector resistor 488 and the emitter resistor 482. Capacitor 490 provides a filter function of the voltage applied to the base of driver transistor 492. The driver transistor 492 is biased at a DC voltage such that a collector output on conductor 510 provides the talk battery voltage to the T2 conductor. The resistor components of the talk battery circuit 70 are selected such that an output voltage of about 15 volts is applied to the T2 conductor.

A series resistor 553 and capacitor 554 network is also connected to the emitter of transistor 480. This network is connected to interconnect line 630 through relay 560. Thus, signals applied by the local central office 16 to the business line 28 can also be coupled through relay 560 to modulate the talk battery circuit 70. In this manner, the central office generated tones are effective to provide a corresponding emitter bias to transistor 480, and thus modulate the talk battery 70 with the tone.

The contacts 79 of relay 572, together with the resistor 84, are effective to close the business line loop, even though the pay station telephone 12 is isolated therefrom by the line splitting relay 80. The winding 578 of relay 572 is operated by applying a logic low to interconnection line 580. The appropriate buffer driver in circuit 68 is activated by the microprocessor 140 as described above in connection with relay 80. The operation of relay 572 is also effective to connect the transformer 78 across the T1 and R1 conductors. DTMF tones generated by the interface 10 can then be applied to the T1 and R1 conductors through transformer 78. DTMF tones generated by the tone generator 76 are applied to the amplifier-driver 77 by interconnection lines 606. Capacitor 608 provides ac coupling between the DTMF tone generator 76 and the amplifier-driver 77. The DTMF tone generator 76 is of the type having four column inputs 668 and four row inputs 670, all driven with a desired pattern of logic signals to produce corresponding DTMF tones on the output interconnection line 606. The DTMF tone generator 76 is of the integrated circuit type MK5089, obtainable from the Mostek Corporation.

A ring detect circuit 74 is connected directly across the T1 and R1 conductors. The ring detector 74 performs the function of detecting incoming ring signals. Incoming ring signals applied to the business line 28 by the local central office 16 are thus detected by the ring back circuit 74. The incoming ring signal is about 90 volts peak ac amplitude. Zener diodes 536 and 538 are each of a type having a reverse breakdown voltage of about 22 volts. Thus, the diodes 536 and 538 will be alternately conducting during the various half cycles of the incoming ring ac signal. A clipped incoming ring signal voltage will appear across resistor 540, which voltage will alternately bias each of the diodes within the optical isolator 542 into conduction. The transistor outPut of the optical isolator 542 is characterized as a digital signal having a period substantially identical to that of the incoming ring signal. The digital pulse train appearing on the output 546 of the optical isolator is available to the microprocessor 140 at monitor point 548.

Various tones carried by the conductors T1 and R1 can also be applied to interconnect line 630 by the amplifier 621. A 90 hertz tone decoder 712 and a 400 hertz tone decoder 718 (FIG. 9d) are coupled to the ring back unlock and demodulator network 672 to the interconnect line 630. The decoders 712 and 718 are enabled for decoding the respective tones by the microprocessor operation of relay 572. Thus, the transformer 78 is connected across the T1 and R1 lines. The network 672 and the 90 hertz tone decoder 712 comprise a precision dial tone detector for detecting the composite 350 and 440 hertz precision dial tone generated by central office switching systems. When the precision dial tone signal is coupled from the T1 and R1 conductors to interconnection line 630, amplifier 674 and diode 676 provide halfwave rectification thereof. The buffer amplifier 680 and capacitor 684 provide filtering of the rectified dial tone signal.

The capacitor-resistor network connecting the output of amplifier 680 to the non-inverting input of amplifier 688 comprise a low frequency filter for demodulating the precision dial tone. As a result cf the demodulating of the precision dial tone component frequencies, the difference frequency thereof is applied to the non-inverting input of amplifier 688. The difference frequency of 90 hertz appears at the output of the amplifier 688, and thus at the input of the 90 hertz tone decoder 712. The difference frequencies of the other call progress tones may also appear at the output of amplifier 688, but will not be decoded by circuit 712 as such other tones are not characterized by a 90 hertz difference frequency. As a result, when the 90 hertz tone decoder detects the 90 hertz frequency, it can be assumed that the precision dial tone appears on the T1 and R1 conductors.

The 90 hertz tone decoder comprises a conventional integrated circuit identified as type LM567 obtainable from National Semiconductor. Various additional resistor and capacitor components (not shown) are connected to the 90 hertz tone decoder 712 for tuning the integrated circuit to be responsive to a 90 hertz input. A microprocessor monitor point 714 is provided at the output of the 90 hertz tone decoder 712 to provide an indication of the detection of the precision dial tone signal.

A 400 hertz tone decoder 718 is also provided for detecting the 400 hertz signal conventionally output by the other common carriers 24. The 400 hertz signal presents an indication to a calling party to enter the authorization code and the number to access the network of the common carrier. The 400 hertz tone decoder 718 comprises an integrated circuit similar to that of the 90 hertz tone decoder 712, but having resistor and capacitor components (not shown) effective for tuning the decoder 718 to the 400 hertz frequency. A series capacitor-resistor network 706 is also coupled between the output of amplifier 688 and the input of the 400 hertz tone decoder 718 to detune such decoder to the 440 hertz frequency components of the ring back and precision dial tone signals. Should either of the ring back or the dial tone signals be demodulated by the circuit 672, the 40 or 90 hertz difference frequencies output by amplifier 688 will also appear at the input of the 400 hertz tone decoder 718. These two difference frequencies will sufficiently perturbate the input signal such that the 400 hertz tone decoder does not respond to the ring back and precision dial tones.

FIG. 9c shows the coin battery generator 124, the reversing relay 122 and coin enable relay 116 for providing a positive or negative voltage to the tip conductor 52 to effect the collection or return of a coin deposited in the pay station telephone 12. Also shown connected to the tip and ring conductors 52 and 54 are the 2200 hertz and 1700 hertz detectors 110 and 108. The foregoing circuits were described above in sufficient detail and will not be further described with the exception that it should be noted that the detectors 108 and 110 are constructed using integrated circuit types LM567, obtainable from National Semiconductor.

Relay 767 is of the normally open type, thereby disconnecting the T1 and R1 conductors from the respective T2 and R2 conductors. Relay 767 is operated by the microprocessor 140 through transistor 768 for self test purposes. The operation of relay 767 effectively connects the pay station telephone directly to the business line 28.

The wideband detector 106 functions in the manner described above to provide a digital signal on output 132 to the microprocessor 140. The envelope detector circuit 780 of the wideband detector is of the type providing an output on line 132 constituting a digital voltage whenever one of the call progress tones is presented on its input. For call progress tones characterized by a cadence, the digital voltage on the output 132 will be at a logic high level during the active tone periods of the cadence, and will be at a logic low level during the silent or inactive periods. The envelope detector circuit 780 may comprise an integrated circuit of the type identified by M980, and obtainable from Teltone Corporation.

According to an important feature of the invention, the business line 28 is connected to the contacts 113 of a fail-safe relay 114 (FIG. 9c). The fail-safe relay 114 is operated by the microprocessor 140 by the application of a voltage to the input 131 of the transistor 792. With this arrangement, the business line 28 is connected through the relay to the power fail call holding relay 112. The fail-safe relay 114 is operated using power supplied from the interface power source 60. Once operated, the power fail call holding relay 112, comprising individual relays 800 and 801, remains operated by the power supplied over the business line 28 by the local central office 16. Therefore, a communication path cut-through from the pay station telephone 12 to the local central office 16 is first initiated by applying a positive voltage to the microprocessor line 131. If the power systems of the pay station telephone interface 10 are operating properly, the conduction of transistor 792 will operate the fail-safe relay 114 and apply the battery supplied from the local central office 16 to the power fail call holding relay 112. The coils of power fail relays 800 and 801 are in series with the respective tip and ring conductors of the business line 28. Thus, with the fail-safe relay 114 initially operated by the talk battery, the central office power will operate relays 800 and 801, thereby closing the respective contacts 115. When operated, the contact pair 115 short circuits the respective contacts 113 of the fail-safe relay 114. With this connection arrangement, the business line 28 is connected through the power fail call holding relay 112 to the T1 and R1 conductors irrespective of the operation or non-operation of the fail-safe relay 114. The capacitors 802 and 804 across relay 800, and the corresponding capacitors across the coil of relay 801, sustain the operation of the relays in the event that there are momentary power transients or fluctuations on the business line 28.

The advantage provided by the power fail call holding relay 112 is that once a communication path has been established between the pay station telephone 12 and the local central office 16, the conversation can continue even if a power failure occurs in the interface 10. The central office 16 continues to supply power over the business line 28, through the power fail call holding relay 112, to operate the circuits of the pay station telephone 12. However, as soon as the calling party using the pay station telephone 12 goes on hook, the communication loop is opened within the pay station telephone 12, thereby interrupting the current flow through the business line. Once the loop current in the business line 28 stops flowing, the relays 800 and 801 release, thereby opening the respective contacts 115.

If the calling party should again lift the receiver 42 off hook, the power fail call holding relay 112 will not automatically operate, and thus a subsequent call, during a power failure of the interface 10 cannot be made. The dual advantage of this feature permits security to the owner of the pay station telephone 12 by preventing telephone calls to be made when the interface 10 is inoperative to collect the money for the call. Also, this feature permits the calling party, who has already deposited coins in the pay station telephone 12, to complete the telephone conversation despite a power failure in the interface 10. Subsequent parties who attempt to make a telephone call using a pay station telephone 12 with an inoperative interface 10 will not receive a dial tone, and thus will not deposit coins.

The pay station telephone interface 10 can communicate with distant equipment by the use of the modem 75. As noted above, information may be transmitted regarding a full coin box condition or a damaged telephone condition by the modem 75 to a distant operation. Servicemen may then be dispatched to either empty the coin box 40 or repair the pay station telephone 12.

Information is communicated bi-directionally between the microprocessor 140 and the modem 75 by bus 830. The microprocessor 140 maintains a tabulation of the number and type of coins deposited in the coin box 40 of the pay station telephone 12. This information is supplied through the 1700 hertz detector 108 and the 2200 hertz detector 110. The denomination of a coin deposited can be determined by noting the burst of the tone signals, as illustrated in FIG. 6. It should be appreciated that the pay station telephone 12 includes circuitry for generating the coin tones of FIG. 6 pursuant to the type of coin deposited. Conventional algorithms are available for correlating the volume of coins held by the coin box 40, based upon the number and type of coins deposited. In the event that it :s determined the coin box 40 is full, the microprocessor 140 loads the appropriate information into the modem 75. The microprocessor 140 then operates relay 806 for connecting the modem transformer 818 to the business line 28. The microprocessor 140 also operates relay 572 (FIG. 9a), thereby establishing a connection of the DTMF generator 76 to the T1 and R1 conductors. The microprocessor 140 causes the DTMF tone generator 76 to outpulse the telephone number of the pay station telephone service organization. After a communication path is established through the central office 16 to the destination service organization, the modem 75 is activated, whereupon the information concerning the full coin box 40 is outpulsed to the service organization.

The pay station telephone interface 10 performs a similar function in notifying the service organization of an apparent damaged condition of the pay station telephone 12. The damaged status of the pay station telephone 12 is determined, as noted above, using indications of repeated dialing, but the detection of no coin deposited. On detecting this situation, the microprocessor 140 loads a different code into the modem 75, establishes a communication path to the service organization, and outpulses the code by the modem 75.

From the foregoing, a sophisticated pay station telephone interface is disclosed. The interface is connected between a conventional pay station telephone and a conventional business line of a local central office. The program controlled processor, and the associated circuits of the interface, enable full service communication capabilities with the pay station telephone, without the coin collect and return signals provided with the coin phone line. Provided with the interface is a unique technique for detecting when the call has been placed by the pay station telephone, and answered at a remote location. The answer is determined by noting the progression of call progress tones transmitted by the local central office. In the absence of specific supervision signals specifying that the call has been answered, the pay station telephone interface can detect an answered call, and effect the collection of the coin accordingly. Importantly, in processing a call placed through the pay station telephone, the interface initially isolates the pay station telephone. Dialed digits and coin tone information are thus received by the interface without such information being transferred to the local central office. The processor complex of the interface then connects the appropriate tone transmitters and detectors to the communication line to accomplish the completion of the telephone call to the desired destination. The processor control complex of the interface is provided with various look-up tables to determine whether the call should be completed, and the route which should be taken. For certain long distance calls, the interface will effect an automatic connection through another common carrier network. For telephone calls requiring operator services, the interface will automatically outpulse the appropriate telephone number, thereby connecting the user of the pay station telephone to the remote location of the operator services. Many other features of the invention are described above, including the provision for enabling an ongoing call to be completed, despite an interface power failure.

While the principles and concepts of the invention have been set forth above, it is to be understood that such equipment is not limited by the disclosure hereof. Also, it is not necessary to adopt all of the various advantages and features of the invention in order to realize the individual advantages thereof. Therefore, while the embodiment of the invention has been disclosed with reference to a pay station telephone, it is to be understood that many changes in detail may be made as a matter of engineering choice without departing from the scope of the invention as defined by the appended claims.

What is claimed is:

1. Apparatus adapted for use with a telephone system of the type supplying a loop current over a line to a telephone set comprising:
   first switch means disposed in series with the line and switchable for providing continuity therethrough so that signals can be carried on the line to the telephone;
   a source of power independent of the loop current for initially operating said first switch means to effect the carrying of telephone signals on the line; and
   a second switch means operable for connecting the telephone to the line, and a control for controlling the operation of said second switch means, said control being responsive to the loop current on the telephone line for switching operation thereof so that when operated the telephone is connected to the line irrespective of the switched state of said first switched means, whereby when the telephone line continuity is initially established by the operation of said first switch means by said independent source of power, the telephone line continuity is not thereafter affected by the loss of said source of independent power.

2. The apparatus of claim 1 wherein said first switch means includes a first switched current path, and said second switch means includes a second switched current path in parallel with the first switched current path.

3. The apparatus of claim 1 wherein said second switch means comprises a relay with a coil in series with the telephone line.

4. The apparatus of claim 3 further including a pair of said relays with respective coils in series with a tip and ring conductor of the telephone line.

5. The apparatus of claim 3 wherein said relay includes a contact switchably bridged across said first switched means.

6. The apparatus of claim 5 wherein said first switch means comprises a relay with a contact in series with the telephone line.

7. The apparatus of claim 1 further including means for sustaining the operation of said second switch means despite fluctuations in said loop current.

8. The apparatus of claim 1 further including means for disconnecting the telephone from the line and for connecting said source of independent power to the telephone.

9. The apparatus of claim 8 wherein said source of independent power comprises a talk battery switchably connected to the telephone.

10. The apparatus of claim 9 further including means for removing said source of independent power from the telephone before the termination of the telephone call.

11. A method for providing security call holding capabilities to a telephone set associated with a communication line adapted for carrying signals and a loop current, comprising the steps of:
    placing a first switched connection in the communication line connected to the telephone set;
    operating the switched connection by an alternate power other than said loop current;
    placing a second switched connection in parallel with said first switched connection; and
    controlling said second switched connection with the loop current so that initially the alternate power can be used to close said first switched connection and allow the loop current to flow through the control of the second switched connection which then maintains a connection between the communication line and the telephone irrespective of the subsequent presence of the alternate power.

12. The method of claim 11 further including supplying a local talk battery to the telephone before the first switched connection is made, and using the talk battery as the alternate power.

13. The method of claim 12 further including removing the local talk battery from the telephone and operating said first switched connection to allow the loop current to flow therethrough to the telephone set.

14. The method of claim 11 further including maintaining said second switched connection closed despite fluctuations of the loop current on the communication line.

15. Apparatus for use with a telephone for controlling connection thereof to a telephone line, comprising:
- a power supply for generating electrical power for circuits of the telephone;
- a fail-safe circuit responsive to the presence of power generated by said power supply for generating a signal;
- a holding circuit responsive to the signal of said fail-safe circuit for providing a latched connection between the telephone line and the telephone so long as loop current is flowing in the telephone line; and
- said holding circuit releasing and opening the connection between the telephone line and the telephone when loop current ceases flowing in the telephone line, and said holding circuit is prevented from being subsequently latched until the generation of a subsequent signal by said fail-safe circuit.

16. The apparatus of claim 15 wherein said fail-safe circuit generates said signal by coupling telephone line current to said holding circuit.

17. The apparatus of claim 16 wherein said fail-safe circuit comprises a relay having a pair of contacts connected in series with respective tip and ring conductors of the telephone line.

18. The apparatus of claim 15 wherein said holding circuit comprises a relay winding connected in series with said telephone line, and the operation of said holding circuit by line current is operative to effectively remove the effect of said fail-safe circuit.

19. The apparatus of claim 18 wherein said fail-safe circuit comprises a switch connected in series with the telephone line, and said hold circuit is operative to be bridged across said fail-safe circuit.

20. A method for providing security call holding capability to a telephone associated with a communication line carrying signals and loop current, comprising the steps of:
- sensing the operability of the telephone and generating a signal when the telephone is operable and preventing generation of said signal when the telephone is inoperable;
- switchably connecting the communication line to the telephone in response to said signal so that audio signals can be carried between the telephone line and the telephone; and
- maintaining said switched connection between the communication line and the telephone so long as loop current is flowing in said communication line, and when loop current is interrupted said switched connection is released and is prevented from subsequent operation except on generation of a subsequent said signal.

21. The method of claim 20 further including providing said signal as a steady state signal.

22. The method of claim 20 further including sensing the operability of the telephone by generating said signal when an internal power supply is operable.

23. The method of claim 20 further including sensing the operability of the telephone by allowing communication line current to operate said switchable connection during operability, and preventing line current from operating said switchable connection when inoperable.

24. The method of claim 20 further including controlling a coin telephone by said method so that if the telephone malfunctions during a telephone call, the call can be completed.

25. The method of claim 24 further including preventing subsequent telephone calls to be made during inoperability of the telephone by preventing communication line current from reaching circuits of the telephone.

26. A method for providing security call holding capability with a pay station telephone connected to a communication line, comprising the steps of maintaining the flow of loop current in said communication line to the pay station telephone during a telephone call irrespective of the inoperability of circuits of the pay station telephone, and subsequent to the completion of the call preventing line current from flowing to the pay station telephone to prevent subsequent telephone calls during inoperable operation of the telephone.

* * * * *

UNITED STATES PATENT AND TRADEMARK OFFICE
CERTIFICATE OF CORRECTION

PATENT NO. : 4,942,604

DATED : July 17, 1990

INVENTOR(S) : Benjamin A. Smith et al.

It is certified that error appears in the above-identified patent and that said Letters Patent is hereby corrected as shown below:

```
Column 23, line 65, change "V." to --V+--.
Column 25, line 57, change "V." to --V+--.
Column 26, lines 12 & 16, change "V." to --V+--.
Column 32, line 56, change "V." to --V+--.
Column 33, line 63, change "9d" to --9b--.
```

Signed and Sealed this

Eighth Day of September, 1992

Attest:

DOUGLAS B. COMER

*Attesting Officer*  *Acting Commissioner of Patents and Trademarks*